(12) United States Patent
Choi et al.

(10) Patent No.: US 10,185,453 B2
(45) Date of Patent: Jan. 22, 2019

(54) PRESSURE SENSOR AND DISPLAY DEVICE INCLUDING THE SAME

(71) Applicant: Samsung Display Co., Ltd., Yongin-si (KR)

(72) Inventors: Sung Min Choi, Yongin-si (KR); Dae Won Kim, Yongin-si (KR); Ik Jun Hong, Yongin-si (KR); Han Ki Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/646,020

(22) Filed: Jul. 10, 2017

(65) Prior Publication Data

US 2018/0018045 A1 Jan. 18, 2018

(30) Foreign Application Priority Data

Jul. 15, 2016 (KR) ........................ 10-2016-0090058

(51) Int. Cl.
*G06F 3/00* (2006.01)
*G06F 3/044* (2006.01)
*G06F 3/041* (2006.01)

(52) U.S. Cl.
CPC ............ *G06F 3/044* (2013.01); *G06F 3/0414* (2013.01); *G06F 3/0416* (2013.01); *G06F 2203/04105* (2013.01); *G06F 2203/04112* (2013.01)

(58) Field of Classification Search
CPC ...... G06F 3/044; G06F 3/0416; G06F 3/0414; G06F 2203/04112; G06F 2203/04105
See application file for complete search history.

(56) References Cited

U.S. PATENT DOCUMENTS

| 9,262,031 | B1 | 2/2016 | Moon et al. |
| 2006/0197753 | A1 | 9/2006 | Hotelling |
| 2010/0013775 | A1 | 1/2010 | Son |

(Continued)

FOREIGN PATENT DOCUMENTS

| EP | 2083472 | 7/2009 |
| EP | 2472366 | 7/2012 |

(Continued)

OTHER PUBLICATIONS

The Extended European Search Report dated Nov. 21, 2017, issued in European Application No. 17181129.2.

(Continued)

*Primary Examiner* — Muhammad N Edun
(74) *Attorney, Agent, or Firm* — H.C. Park & Associates, PLC

(57) ABSTRACT

A pressure sensor including a first conductor located in a pressure sensing region including a first sensing region and a second sensing region; and a second conductor spaced apart from the first conductor, the second conductor forming capacitance with the first conductor. The first conductor includes a first conductive part located in the first sensing region and a second conductive part located in the second sensing region. The area ratio of the second conductive part with respect to the second sensing region is different from the area ratio of the first conductive part with respect to the first sensing region.

36 Claims, 26 Drawing Sheets

(56) References Cited

U.S. PATENT DOCUMENTS

| | | | |
|---|---|---|---|
| 2012/0038583 A1* | 2/2012 | Westhues | G06F 3/0412 345/174 |
| 2013/0082970 A1 | 4/2013 | Frey et al. | |
| 2014/0035849 A1 | 2/2014 | Jung et al. | |
| 2014/0043289 A1 | 2/2014 | Stern | |
| 2015/0048848 A1* | 2/2015 | Dawson | G01R 27/2605 324/671 |
| 2015/0153895 A1 | 6/2015 | Hotelling | |
| 2015/0199057 A1 | 7/2015 | Minami et al. | |
| 2016/0291761 A1* | 10/2016 | Huie | G06F 3/0414 |
| 2016/0378259 A1* | 12/2016 | Schediwy | G06F 3/044 345/174 |

FOREIGN PATENT DOCUMENTS

| | | |
|---|---|---|
| EP | 2930597 | 10/2015 |
| EP | 2975374 | 1/2016 |
| EP | 2983067 | 2/2016 |
| KR | 10-2013-0109090 | 10/2013 |
| KR | 10-1598412 | 2/2016 |
| WO | 2011142332 | 11/2011 |

OTHER PUBLICATIONS

The Extended European Search Report dated Nov. 17, 2017, issued in European Application No. 17180934.6.

* cited by examiner

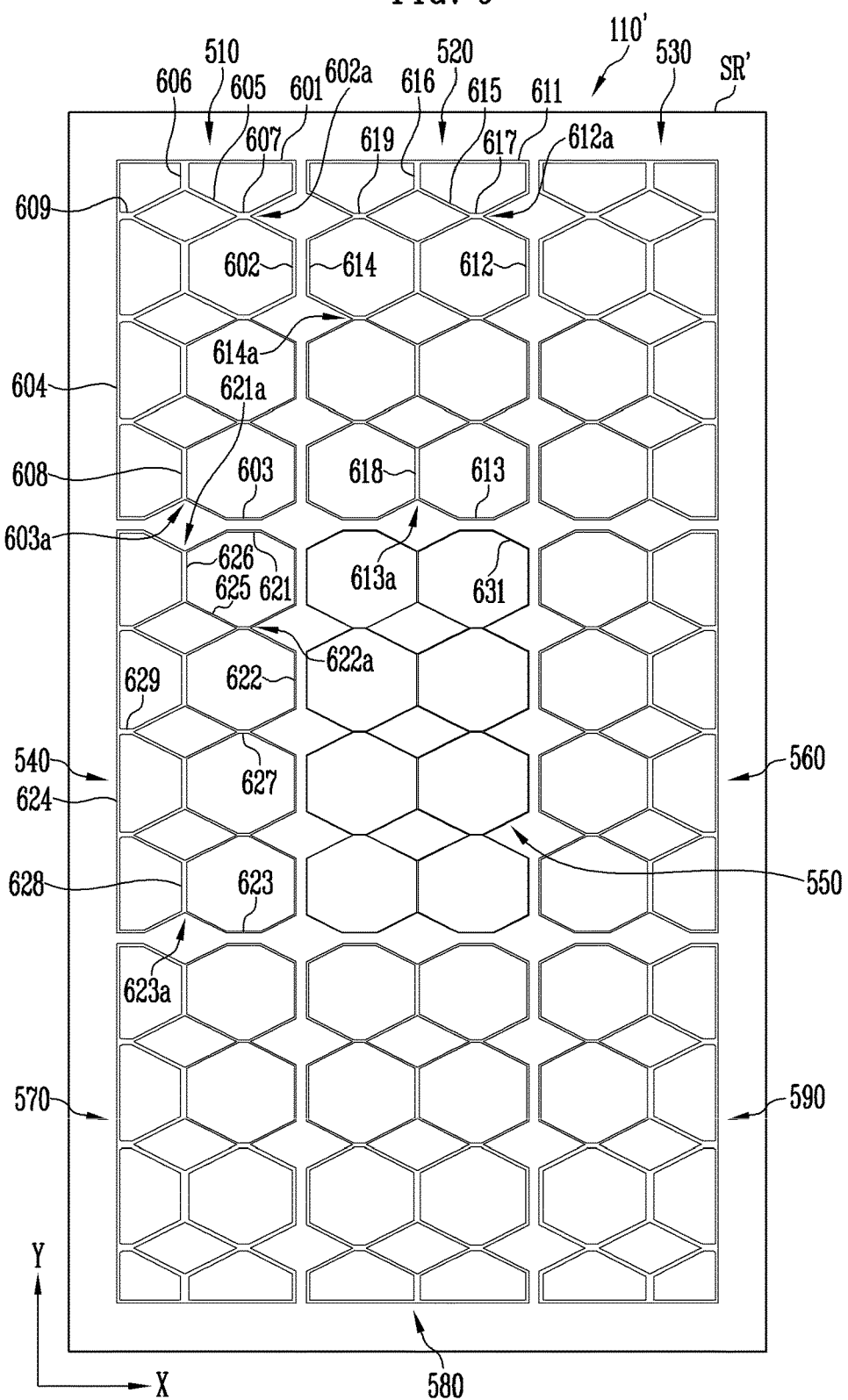

PRESSURE SENSOR AND DISPLAY DEVICE INCLUDING THE SAME

CROSS-REFERENCE TO RELATED APPLICATION

This application claims priority from and the benefit of Korean Patent Application No. 10-2016-0090058, filed on Jul. 15, 2016, which is hereby incorporated by reference for all purposes as if fully set forth herein.

BACKGROUND

Field

An aspect of the present disclosure relates to a pressure sensor and a display device including the same.

Discussion of the Background

As interest in information displays and demand for portable information media increase, research and commercialization has become more focused on display devices.

Recent display devices include touch sensors for receiving touch inputs of users in addition to image display functions. Accordingly, the users can more conveniently use the display devices through the touch sensors.

In addition, various functions have recently been provided to users using not only the position of a touch but also pressure generated due to the touch.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a pressure sensor and a display device including the same, which can detect touch pressure.

Exemplary embodiments also provide a pressure sensor and a display device including the same, which can reduce a recognition error of touch pressure.

Additional aspects will be set forth in the detailed description which follows, and, in part, will be apparent from the disclosure, or may be learned by practice of the inventive concept.

An exemplary embodiment of the present invention discloses a pressure sensor including: a first conductor located in a pressure sensing region including a first sensing region and a second sensing region; and a second conductor spaced apart from the first conductor, the second conductor forming capacitance with the first conductor. The first conductor includes: a first conductive part located in the first sensing region; and a second conductive part located in the second sensing region, wherein the area ratio of the second conductive part with respect to the second sensing region is different from the area ratio of the first conductive part with respect to the first sensing region.

An exemplary embodiment of the present invention also discloses a display panel; a touch sensor located at one side of the display panel, the touch sensor detecting a position of a touch; and a pressure sensor located at the other side of the display panel, the pressure sensor detecting pressure of the touch. The pressure sensor includes: a first conductor located in a pressure sensing region including a first sensing region and a second sensing region; and a second conductor located to be spaced apart from the first conductor, the second conductor forming capacitance with the first conductor. The first conductor includes: a first conductive part located in the first sensing region; and a second conductive part located in the second sensing region, wherein the area ratio of the second conductive part with respect to the second sensing region is different from the area ratio of the first conductive part with respect to the first sensing region.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 9 is a view illustrating a first conductor according to another exemplary embodiment of the present disclosure.

DETAILED DESCRIPTION OF THE ILLUSTRATED EMBODIMENTS

Figure 1:
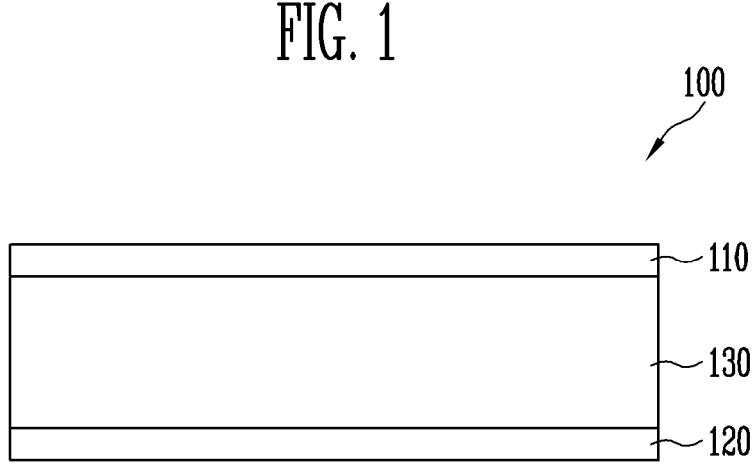
FIG. 1 is a view illustrating a pressure sensor according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a view illustrating a pressure sensor according to an exemplary embodiment of the present disclosure.

Referring to FIG. 1, the pressure sensor 100 according to the exemplary embodiment of the present disclosure may include a first conductor 110, a second conductor 120, and an elastic member 130.

The first conductor 110 and the second conductor 120 may be spaced apart from each other. In this case, the first conductor 110 and the second conductor 120 may function as a capacitor, and capacitance may be formed between the first conductor 110 and the second conductor 120.

The capacitance between the first conductor 110 and the second conductor 120 may be changed depending on the spacing distance between the first conductor 110 and the second conductor 120.

For example, when a touch occurs in the pressure sensor 100, the distance between the first conductor 110 and the second conductor 120 is changed corresponding to the touch, and therefore, the capacitance may be changed.

Accordingly, when a touch occurs, a variation in capacitance is detected, so that pressure caused by the touch can be detected.

The first conductor 110 and the second conductor 120 may include a conductive material. In an exemplary embodiment of the present invention, the conductive material may include metals or an alloy thereof. The metals that may be used include gold (Au), silver (Ag), aluminum (Al), molybdenum (Mo), chromium (Cr), titanium (Ti), nickel (Ni), neodymium (Nd), copper (Cu), platinum (Pt), and the like.

The first conductor 110 and the second conductor 120 may be made of a transparent conductive material. The transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, graphene, and the like. The first conductor 110 and the second conductor 120 may be formed in single or multiple layers.

The second conductor 120 may be made of the same material as the first conductor 110, or the second conductor 120 may be made of a different material from the first conductor 110.

For example, the second conductor 120 may have a plate shape in which the second conductor 120 can entirely overlap with the first conductor 110.

In FIG. 1, a case where the first conductor 110 is located over the second conductor 120 has been illustrated as an example, but the first conductor 110 may alternatively be located under the second conductor 120.

The elastic member 130 may be located between the first conductor 110 and the second conductor 120.

For example, one surface of the elastic member 130 may contact the first conductor 110, and the other surface of the elastic member 130 may contact the second conductor 120.

The elastic member 130 may function to reduce external impact. To this end, the elastic member 130 may have elasticity. For example, the elastic member 130 is deformed by pressure from the outside, and may have elasticity that enables the elastic member 130 to return to the original state when the pressure from the outside is eliminated.

In addition, the elastic member 130 may have an insulating property so as to prevent an electrical short circuit between the first conductor 110 and the second conductor 120.

The elastic member 130 may be provided as a porous polymer to have elasticity. For example, the elastic member 130 may be provided in the form of a foam body, such as sponge.

For example, the elastic member 130 may include thermoplastic elastomer, polystyrene, polyolefin, polyurethane thermoplastic elastomers, polyamides, synthetic rubbers, polydimethylsiloxane, polybutadiene, polyisobutylene, poly (styrene-butadienestyrene), polyurethanes, polychloroprene, polyethylene, silicone, and the like, and combinations thereof, but the present disclosure is not limited thereto.

Figure 2A:
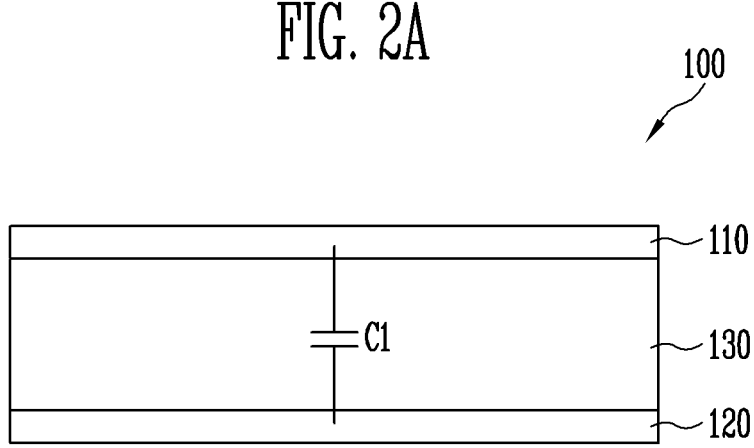
FIG. 2A and FIG. 2B are views illustrating an operation of the pressure sensor shown in FIG. 1.
Figure 2B:
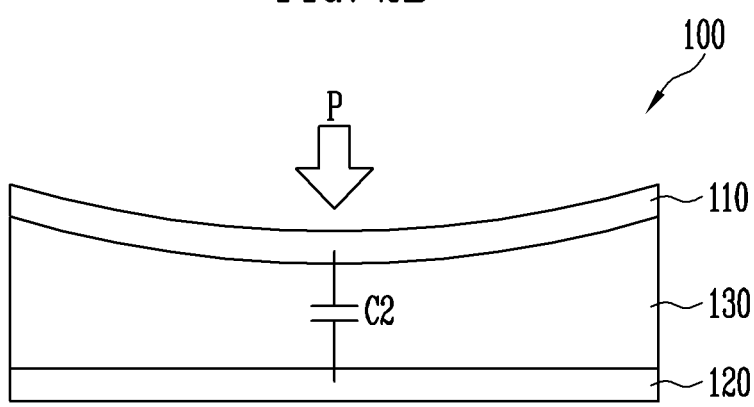

FIGS. 2A and 2B are views illustrating an operation of the pressure sensor shown in FIG. 1. Particularly, FIG. 2A illustrates a state in which pressure P is not applied to the pressure sensor 100, and FIG. 2B illustrates a state in which the pressure P is applied to the pressure sensor 100.

Referring to FIG. 2A, when the pressure P is not applied to the pressure sensor 100, a first capacitance C1 may be formed between the first conductor 110 and the second conductor 120.

Referring to FIG. 2B, when the pressure P is applied to the pressure sensor 100 according to a user's touch, etc., the distance between the first conductor 110 and the second conductor 120 is changed, and therefore, the capacitance between the first conductor 110 and the second conductor 120 may be changed. For example, the first capacitance C1 may be changed to a second capacitance C2 by the applied pressure P.

Consequently, as the external pressure P increases, the capacitance between the first conductor 110 and the second conductor 120 can increase.

Thus, the intensity, etc. of the pressure P can be detected by using a variation in capacitance generated in the pressure sensor 100.

The pressure P applied to the pressure sensor 100 may be mainly generated by a user's touch, but the present disclosure is not limited thereto. That is, the pressure P applied to the pressure sensor 100 may be generated by various causes except the user's touch.

Figure 3:
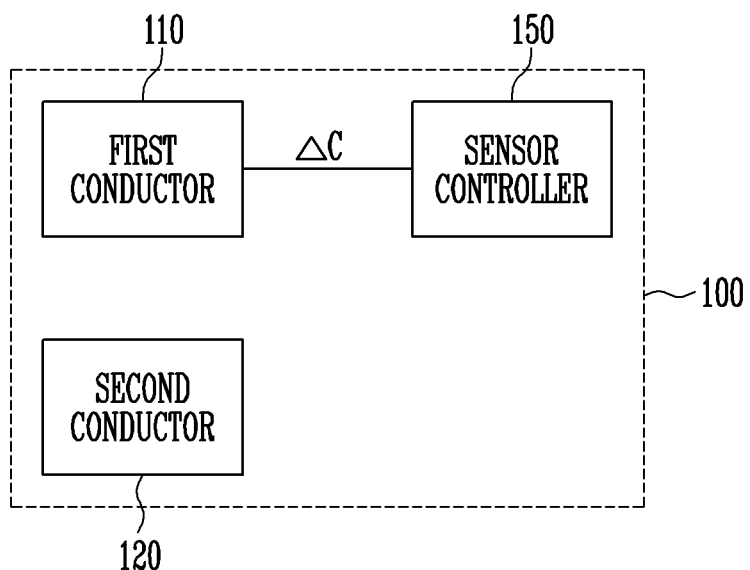
FIG. 3 is a view illustrating the pressure sensor including a sensor controller according to an exemplary embodiment of the present disclosure.

FIG. 3 is a view illustrating the pressure sensor including a sensor controller according to an exemplary embodiment of the present disclosure. Particularly, in FIG. 3, the illustration of the elastic member 130 has been omitted for convenience of description.

Referring to FIG. 3, the pressure sensor 100 according to the exemplary embodiment of the present disclosure may further include a sensor controller 150.

The sensor controller 150 detects a variation $\Delta C$ in capacitance existing between the first conductor 110 and the second conductor 120, to detect pressure applied to the pressure sensor 100.

To this end, the sensor controller 150 may be connected to the first conductor 110.

For example, the sensor controller 150 may detect a variation $\Delta C$ in capacitance using an output signal of the first conductor 110.

The method of detecting the variation $\Delta C$ in capacitance may vary. For example, the sensor controller 150 need not be connected to the first conductor 110 but instead may be connected to the second conductor 120. Alternatively, the sensor controller 150 may be simultaneously connected to the first conductor 110 and the second conductor 120 to detect the variation $\Delta C$ in capacitance.

Figure 4:
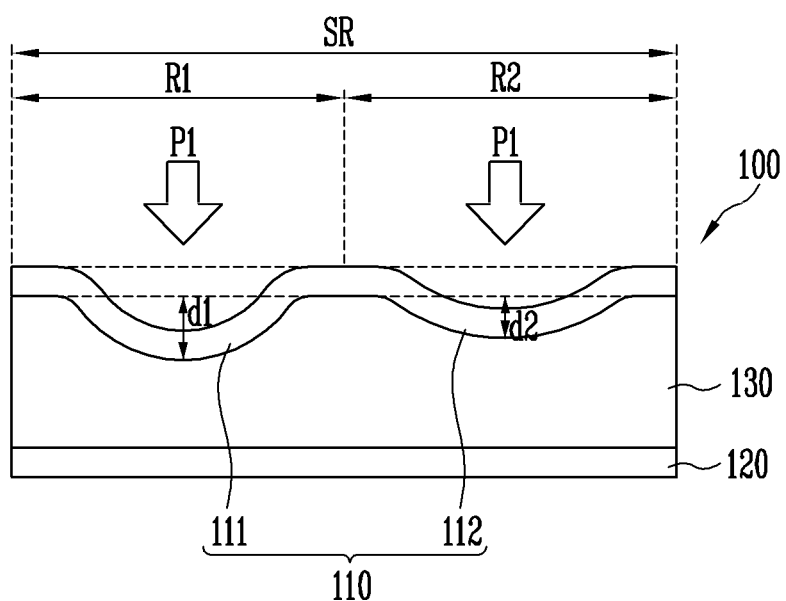
FIG. 4 is a sectional view illustrating a pressure sensing region of the pressure sensor according to an exemplary embodiment of the present disclosure.

FIG. 4 is a sectional view illustrating a pressure sensing region of the pressure sensor according to an exemplary embodiment of the present disclosure.

Referring to FIG. 4, the pressure sensor 100 according to the exemplary embodiment of the present disclosure may have a pressure sensing region SR.

The first conductor 110, the second conductor 120, and the elastic member 130, which are described above, may be arranged in the pressure sensing region SR. Accordingly, the pressure sensing region SR can be defined as a region in which a touch is input by a user.

For example, the pressure sensing region SR may include a first sensing region R1 and a second sensing region R2.

In addition, the first conductor 110 may include a first conductive part 111 located in the first sensing region R1 and a second conductive part 112 located in the second sensing region R2.

In this case, the first conductive part 111 and the second conductive part 112 may be electrically connected to each other, or may be electrically isolated from each other.

However, because of characteristics of the elastic member 130 and/or a member (e.g., a bracket) for supporting the pressure sensor 100, the degree to which the elastic member 130 is pressed (or the variation in distance between the first conductor 110 and the second conductor 120) is changed depending on a position in the pressure sensing region SR, even when the same pressure is applied.

That is, when the same pressure P1 is applied to the first sensing region R1 and the second sensing region R2, a variation d1 in distance between the first conductive part 111 and the second conductor 120 may be different from a variation d2 in distance between the second conductive part 112 and the second conductor 120.

In this case, the variation d1 in distance between the first conductive part 111 and the second conductor 120 may be considered as a variation in thickness of the elastic member 130 in the first sensing region R1, and the variation d2 in distance between the second conductive part 112 and the second conductor 120 may be considered as a variation in thickness of the elastic member 130 in the second sensing region R2.

Therefore, when the same pressure P1 is applied to the first sensing region R1 and the second sensing region R2, the variation in thickness of the elastic member 130 may be changed for each of the first sensing region R1 and the second sensing region R2.

For example, the variation d1 in distance between the first conductive part 111 and the second conductor 120 may be greater than the variation d2 in distance between the second conductive part 112 and the second conductor 120.

That is, when the same touch pressure P1 is applied to the first sensing region R1 and the second sensing region R2, a variation in capacitance generated in the second sensing region R2 becomes small, as compared with the first sensing region R1.

Therefore, since the variation in capacitance generated for each position is changed even when the same pressure P1 is applied, the actual pressure detected by the sensor controller 150 is also changed for each position.

This causes an error in pressure detection. In order to prevent this, the variation in capacitance generated in the second sensing region R2 is to be compensated, so that the compensated variation becomes equal to the variation in capacitance generated in the first sensing region R1.

To this end, the area ratio of the second conductive part 112 with respect to the second sensing region R2 may be set different from the area ratio of the first conductive part 111 with respect to the first sensing region R1.

For example, in order to increase the variation in capacitance generated in the second sensing region R2, the area ratio of the second conductive part 112 with respect to the second sensing region R2 may be set greater than the area ratio of the first conductive part 111 with respect to the first sensing region R1.

Figure 5:
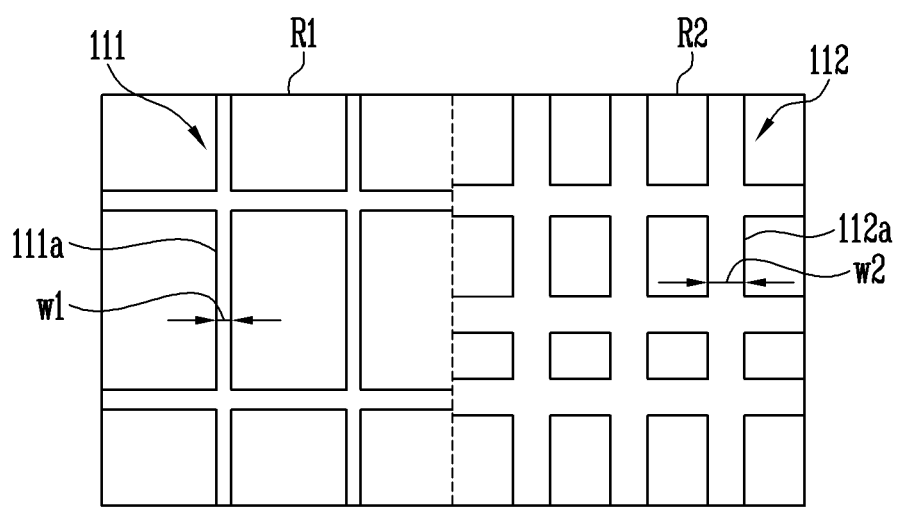
FIG. 5 is a plan view illustrating the pressure sensing region of the pressure sensor according to the exemplary embodiment of the present disclosure.

FIG. 5 is a plan view illustrating the pressure sensing region of the pressure sensor according to an exemplary embodiment of the present disclosure.

Referring to FIG. 5, the area ratio of the second conductive part 112 with respect to the second sensing region R2 may be set greater than the area ratio of the first conductive part 111 with respect to the first sensing region R1.

To this end, a width w2 of conductive lines 112a included in the second conductive part 112 may be set to be greater than a width w1 of conductive lines 111a included in the first conductive part 111.

In addition, the density of the conductive lines 112a included in the second conductive part 112 may be set to be greater than the density of the conductive lines 111a included in the first conductive part 111.

The area ratio of the first conductive part 111 with respect to the first sensing region R1 refers to a ratio at which the first conductive part 111 is occupied in the first sensing region R1, and may be calculated by dividing the area of the first sensing region R1 into the area of the first conductive part 111.

The area ratio of the second conductive part 112 with respect to the second sensing region R2 refers to a ratio at which the second conductive part 112 is occupied in the second sensing region, and may be calculated by dividing the area of the second sensing region R2 into the area of the second conductive part 112.

In addition, the first sensing region R1 and the second sensing region R2 may be set to have the same area.

However, in another exemplary embodiment, the area of the first sensing region R1 may differ from the area of the second sensing region R2.

Figure 6:
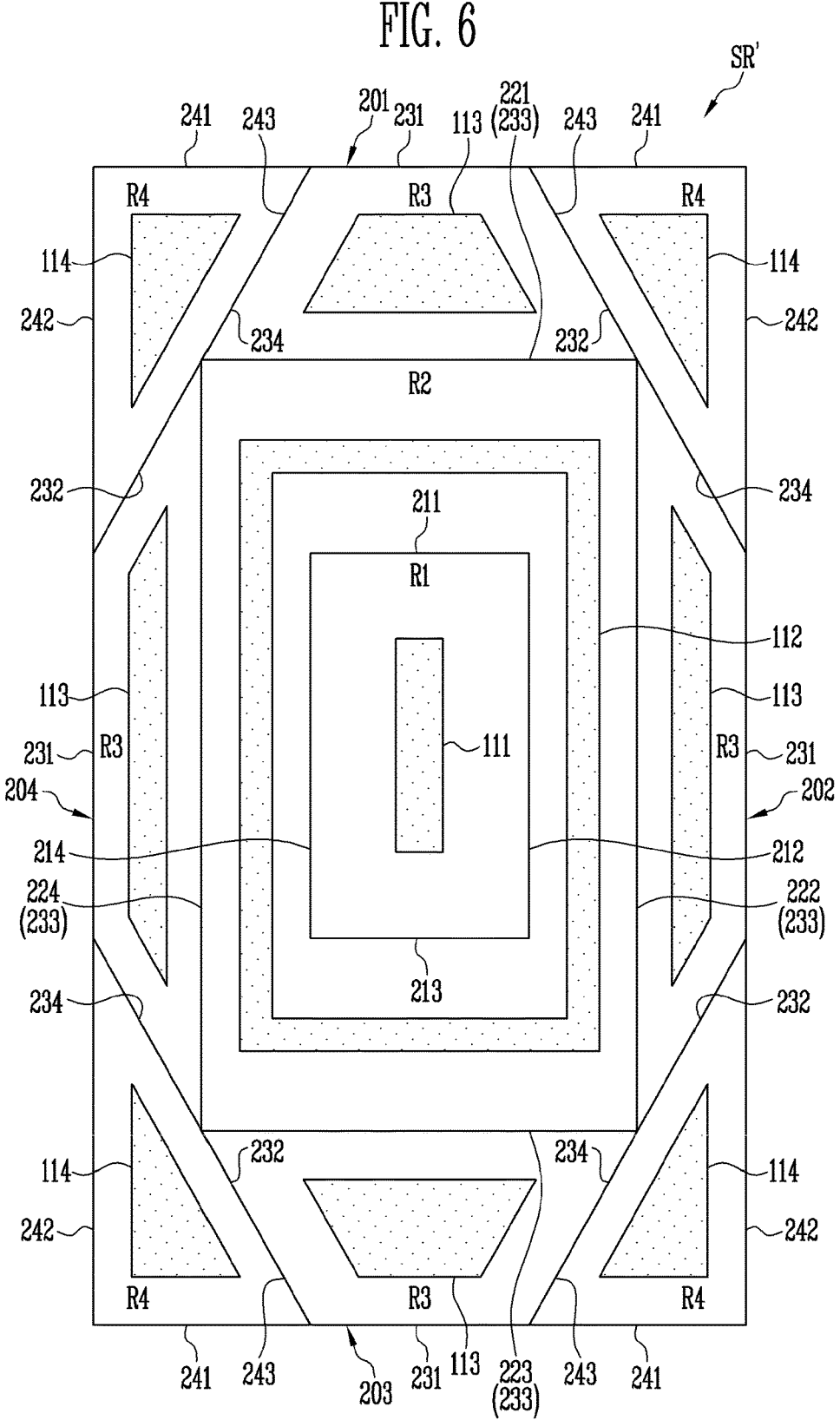
FIG. 6 is a view illustrating a pressure sensing region of the pressure sensor according to another exemplary embodiment of the present disclosure.

FIG. 6 is a view illustrating a pressure sensing region of the pressure sensor according to another exemplary embodiment of the present disclosure.

Referring to FIG. 6, the pressure sensor 100 according to this exemplary embodiment of the present disclosure may include a pressure sensing region SR' divided into a plurality of sensing regions R1, R2, R3, and R4.

In this case, the sensing regions R1, R2, R3, and R4 may be divided based on a pressing amount of the elastic member 130, and the pressure sensing region SR' may have a quadrangular shape.

For example, the pressure sensing region SR' may include a first sensing region R1, a second sensing region R2, third sensing regions R3, and fourth sensing regions R4.

The first sensing region R1 is a region located at the center of the pressure sensing region SR'. When the same pressure is applied, the variation in thickness of the elastic member 130 in the first sensing region R1 may be greatest as compared with the other sensing regions R2, R3, and R4.

In addition, the first sensing region R1 may have a quadrangular shape, and a first conductive part 111 may be located in the first sensing region R1.

The second sensing region R2 is a region located at the periphery of the first sensing region R1. When the same pressure is applied, the variation in thickness of the elastic member 130 in the second sensing region R2 is less than the variation in thickness of the elastic member 130 in the first sensing region R1, but may be greater than the variation in thickness of the elastic member 130 in the other sensing regions R3 and R4.

In addition, the second sensing region R2 may have a quadrangular shape surrounding the first sensing region R1, and a second conductive part 112 may be located in the second sensing region R2.

The third sensing regions R3 are four regions respectively contacting sides 221, 222, 223, and 224 of the second sensing region R2, and partially receive a fixing force provided by a support member of the pressure sensor 100. Therefore, when the same pressure is applied, the variation in thickness of the elastic member 130 in the third sensing regions R3 is less than the variation in thickness of the elastic member 130 in the second sensing region R2, but may be greater than the variation in thickness of the elastic member 130 in the fourth sensing region R4.

In addition, each of the third sensing regions R3 may have a trapezoidal shape, and third conductive parts 113 may be located in the third sensing regions R3.

The fourth sensing regions R4 are four regions respectively located at corners of the pressure sensing region SR', and receive the greatest fixing force caused by the support member of the pressure sensor 100. Therefore, when the same pressure is applied, the variation in thickness of the elastic member 130 in the fourth sensing regions R4 may be smallest as compared with the other sensing regions R1, R2, and R3.

In addition, each of the fourth sensing regions R4 may have a triangular shape, and fourth conductive parts 114 may be located in the fourth sensing regions R4.

The area ratios of the conductive parts 111, 112, 113, and 114 with respect to the respective sensing regions R1, R2, R3, and R4 may be set to be different such that the variations in capacitance generated in the respective sensing regions R1, R2, R3, and R4 are set to be about equal to one another.

Specifically, the area ratio of the first conductive part 111 with respect to the first sensing region R1, the area ratio of the second conductive part 112 with respect to the second sensing region R2, the area ratio of the third conductive parts 113 with respect to the third sensing regions R3, and the area ratio of the fourth conductive parts 114 with respect to the fourth sensing regions R4 may be set to be different from one another.

For example, the area ratio of the first conductive part 111 with respect to the first sensing region R1, the area ratio of the second conductive part 112 with respect to the second sensing region R2, the area ratio of the third conductive parts 113 with respect to the third sensing regions R3, and the area ratio of the fourth conductive parts 114 with respect to the fourth sensing regions R4 may sequentially increase.

That is, the area ratio of the second conductive part 112 with respect to the second sensing region R2 may be set to be greater than the area ratio of the first conductive part 111 with respective to the first sensing region R1, the area ratio of the third conductive parts 113 with respect to the third sensing regions R3 may be set to be greater than the area ratio of the second conductive part 112 with respective to the second sensing region R2, and the area ratio of the is fourth conductive parts 114 with respect to the fourth sensing regions R4 may be set to be greater than the area ratio of the third conductive parts 113 with respect to the third sensing regions R3.

In FIG. 6, the shapes of the first conductive part 111, the second conductive part 112, the third conductive parts 113, and the fourth conductive parts 114 have been schematically illustrated for convenience of description, and the shape of each of the conductive parts 111, 112, 113, and 114 may be variously modified.

The conductive parts 111, 112, 113, and 114 constituting the first conductive part 110 may be electrically isolated from one another. In another exemplary embodiment, at least portions of the conductive parts 111, 112, 113, and 114 may be electrically connected to each other.

Meanwhile, the shapes of the sensing regions R1, R2, R3, and R4 will be described in detail with reference to FIG. 6.

The first sensing region R1 may have a rectangular shape including a first side 211, a second side 212, a third side 213, and a fourth side 214. The first sensing region R1 may be located inside the second sensing region R2.

The second sensing region R2 may have a rectangular shape including a first side 221, a second side 222, a third side 223, and a fourth side 224.

The first side 221 and the third side 223 of the second sensing region R2 may be parallel to the first side 211 and the third side 213 of the first sensing region R1. Each of the first side 221 and the third side 223 of the second sensing region R2 may have a length two times greater than that of each of the first side 211 and the third side 213 of the first sensing region R1.

Each of the fourth sensing regions R4 may have a right-angled triangular shape, including a first side 241, a second side 242, and a third side 243 connected between the first side 241 and the second side 242.

Each of the third regions R3 may have a trapezoidal shape, including a first side 231, a second side 232, a third side 233, and a fourth side 234.

The second sides 232 and the fourth sides 234 of the third sensing regions R3 may be set to be portions of the third sides 243 included in the fourth sensing regions R4, respectively. The third sides 233 of the third sensing regions R3 may be set to be sides identical to as the sides 221, 222, 223, and 224 of the second sensing region, respectively.

Vertexes of the second sensing region R2 may contact the third sides 243 of the fourth sensing regions R4, respectively.

For example, the vertexes of the second sensing region R2 may be connected to the centers of the third sides 243 of the fourth sensing regions R4, respectively.

The pressure sensing region SR' may have a rectangular shape including a first side 201, a second side 202, a third side 203, and a fourth side 204.

Each of the first side 201 and the third side 203 of the pressure sensing region SR' may be configured with the first sides 241 included in a pair of fourth sensing regions R4 and the first side 231 included in the third sensing region R3. Each of the second side 202 and the fourth side 204 of the pressure sensing region SR' may be configured with the second sides 242 included in a pair of fourth sensing regions R4 and the first side 231 included in the third sensing region R3.

The first side 231 of the third sensing region R3, which is included in each of the first side 201 and the third side 203 of the pressure sensing region SR', may have the same length as the first side 241 of the fourth sensing region R4. The first side 231 of the third sensing region R3, which is included in each of the second side 202 and the fourth side 204 of the pressure sensing region SR', may have the same length as the second side 242 of the fourth sensing region R4.

The first side 201 and the third side 203 of the pressure sensing region SR' may be parallel to the first side 211 and the third side 213 of the first sensing region R1. Each of the first side 201 and the third side 203 of the pressure sensing region SR' may have a length three times greater than that of each of the first side 211 and the third side 213 of the first sensing region R1.

In addition, the second side 202 and the fourth side 204 of the pressure sensing region SR' may be parallel to the second side 212 and the fourth side 214 of the first sensing region R1. Each of the second side 202 and the fourth side 204 of the pressure sensing region SR may have a length three times greater than that of each of the second side 212 and the fourth side 214 of the first sensing region R1.

Figure 7:
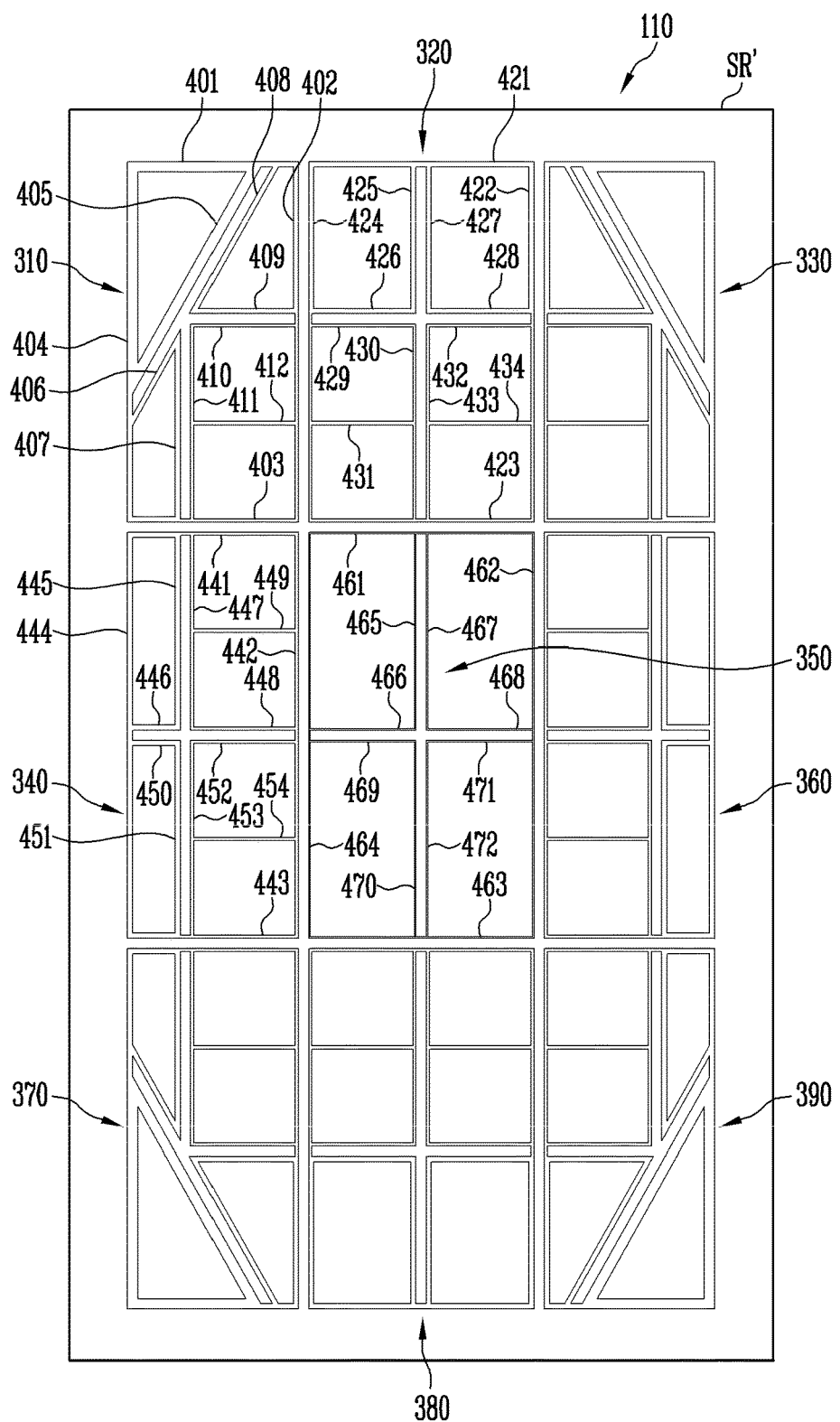
FIG. 7 is a view illustrating a first conductor according to an exemplary embodiment of the present disclosure.

FIG. 7 is a view illustrating a first conductor according to an exemplary embodiment of the present disclosure.

Referring to FIG. 7, the first conductor 110 according to an exemplary embodiment of the present disclosure may include a plurality of sub-conductors 310, 320, 330, 340, 350, 360, 370, 380, and 390.

The first to ninth sub-conductors 310 to 390 may be electrically isolated from one another. In this case, the first to ninth sub-conductors 310 to 390 may be individually connected to the sensor controller 150.

The first sub-conductor 310 may include first to fourth conductive lines 401, 402, 403, and 404 constituting a quadrangle, a fifth conductive line 405 obliquely connected between the first conductive line 401 and the fourth conductive line 404, a sixth conductive line 406 extending in parallel to the fifth conductive line 405 from the fourth conductive line 404, a seventh conductive line 407 connected between the sixth conductive line 406 and the third conductive line 403, an eighth conductive line 408 extending in parallel to the fifth conductive line 405 from the first conductive line 401, a ninth conductive line 409 connected between the eighth conductive line 408 and the second conductive line 402, a tenth conductive line 410 extending from the second conductive line 402, the tenth conductive line 410 being parallel to the ninth conductive line 409, an eleventh conductive line 411 connected between the tenth conductive line 410 and the third conductive line 403, the eleventh conductive line 411 being parallel to the seventh conductive line 407, and a twelfth conductive line 412 connected between the eleventh conductive line 411 and the second conductive line 402, the twelfth conductive line 412 being parallel to the tenth conductive line 410.

The second sub-conductor 320 may include first to fourth conductive lines 421, 422, 423, and 424 constitute a quadrangle, a fifth conductive line 425 extending from the first conductive line 421, the fifth conductive line 425 being parallel to the second conductive line 422, a sixth conductive line 426 connected between the fifth conductive line 425 and the fourth conductive line 424, the sixth conductive line 426 being parallel to the first conductive line 421, a seventh conductive line 427 extending from the first conductive line 421, the seventh conductive line 427 being parallel to the fifth conductive line 425, an eighth conductive line 428 connected between the seventh conductive line 427 and the second conductive line 422, the eighth conductive line 428 being parallel to the first conductive line 421, a ninth conductive line 429 extending from the fourth conductive line 424, the ninth conductive line 429 being parallel to the sixth conductive line 426, a tenth conductive line 430 connected between the ninth conductive line 429 and the third conductive line 423, the tenth conductive line 430 being parallel to the fourth conductive line 424, an eleventh conductive line 431 connected between the tenth conductive line 430 and the fourth conductive line 424, the eleventh conductive line 431 being parallel to the ninth conductive line 429, a twelfth conductive line 432 extending from the second conductive line 422, the twelfth conductive line 432 being parallel to the eighth conductive line 428, a thirteenth conductive line 433 connected between the twelfth conductive line 432 and the third conductive line 423, the thirteenth conductive line 433 being parallel to the tenth conductive line 430, and a fourteenth conductive line 434 connected between the thirteenth conductive line 433 and the third conductive line 423, the fourteenth conductive line 434 being parallel to the twelfth conductive line 432.

The third sub-conductor 330 has a bilaterally symmetrical shape with the first sub-conductor 310, and therefore, its detailed description will be omitted.

The fourth sub-conductor 340 may include first to fourth conductive lines 441, 442, 443, and 444 constituting a quadrangle, a fifth conductive line 445 extending from the first conductive line 441, the fifth conductive line 445 being parallel to the fourth conductive line 444, a sixth conductive line 446 connected between the fifth conductive line 445 and the fourth conductive line 444, the sixth conductive line 446 being parallel to the first conductive line 441, a seventh conductive line 447 extending from the first conductive line 441, the seventh conductive line 447 being parallel to the second conductive line 442, an eighth conductive line 448 connected between the seventh conductive line 447 and the second conductive line 442, the eighth conductive line 448 being parallel to the first conductive line 441, a ninth conductive line 449 connected between the seventh conductive line 447 and the second conductive line 442, the ninth conductive line 449 being parallel to the eighth conductive line 448, a tenth conductive line 450 extending from the fourth conductive line 444, the tenth conductive line 450 being parallel to the sixth conductive line 446, an eleventh conductive line 451 connected between the tenth conductive line 450 and the third conductive line 443, the eleventh conductive line 451 being parallel to the fourth conductive line 444, a twelfth conductive line 452 extending from the second conductive line 442, the twelfth conductive line 452 being parallel to the eighth conductive line 448, a thirteenth conductive line 453 connected between the twelfth conductive line 452 and the third conductive line 443, the thirteenth conductive line 453 being parallel to the eleventh conductive line 451, and a fourteenth conductive line 454 connected between the thirteenth conductive line 453 and the second conductive line 442, the fourteenth conductive line 453 being parallel to the twelfth conductive line 452.

The fifth sub-conductor 350 may include first to fourth conductive lines 461, 462, 463, and 464 constituting a quadrangle, a fifth conductive line 465 extending from the first conductive line 461, the fifth conductive line 465 being parallel to the fourth conductive line 464, a sixth conductive line 466 connected between the fifth conductive line 465 and the fourth conductive line 464, the sixth conductive line 466 being parallel to the first conductive line 461, a seventh conductive line 467 extending from the first conductive line 461, the seventh conductive line 467 being parallel to the second conductive line 462, an eighth conductive line 468 connected between the seventh conductive line 467 and the second conductive line 462, the eighth conductive line 468 being parallel to the first conductive line 461, a ninth conductive line 469 extending from the fourth conductive line 464, the ninth conductive line 469 being parallel to the sixth conductive line 466, a tenth conductive line 470 connected between the ninth conductive line 469 and the third conductive line 463, the tenth conductive line 470 being parallel to the fourth conductive line 464, an eleventh conductive line 471 extending from the second conductive line 462, the eleventh conductive line 471 being parallel to the eighth conductive line 468, and a twelfth conductive line 472 connected between the eleventh conductive line 471 and the third conductive line 463, the twelfth conductive line 472 being parallel to the tenth conductive line 470.

The sixth sub-conductor 360 has a bilaterally symmetrical shape with the fourth sub-conductor 340, and therefore, and therefore, its detailed description will be omitted.

The seventh sub-conductor 370 has a bilaterally symmetrical shape with the first sub-conductor 310, and therefore, its detailed description will be omitted.

The eighth sub-conductor 380 has a bilaterally symmetrical shape with the second sub-conductor 320, and therefore, its detailed description will be omitted.

The ninth sub-conductor 390 has a bilaterally symmetrical shape with the seventh sub-conductor 370, and therefore, its detailed description will be omitted.

FIGS. 8A to 8D are views illustrating states in which the first conductor of FIG. 7 is located in the sensing regions.

Figure 8A:
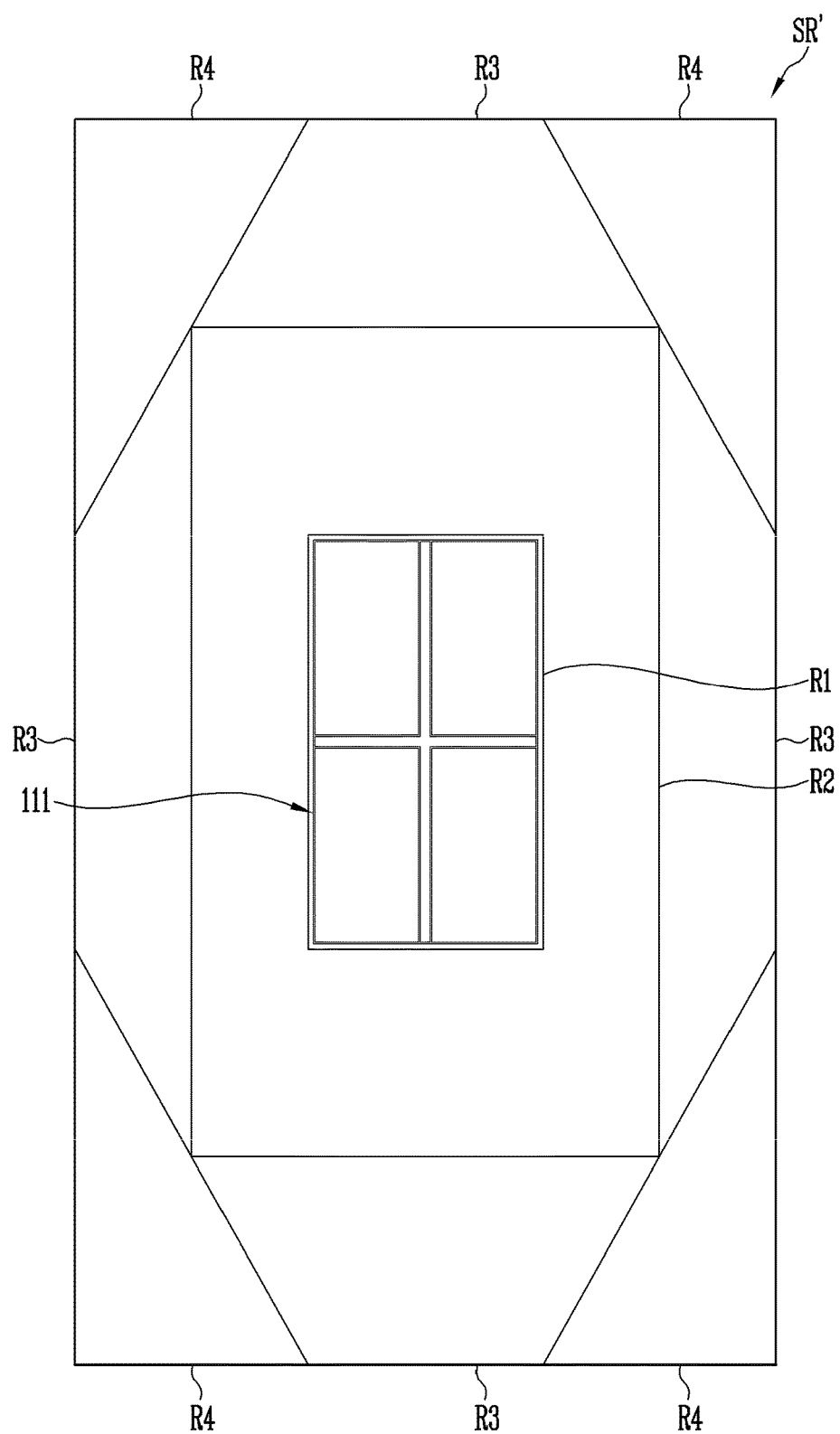
FIG. 8A, FIG. 8B, FIG. 8C, and FIG. 8D are views illustrating states in which the first conductor of FIG. 7 is located in sensing regions.
Figure 8B:
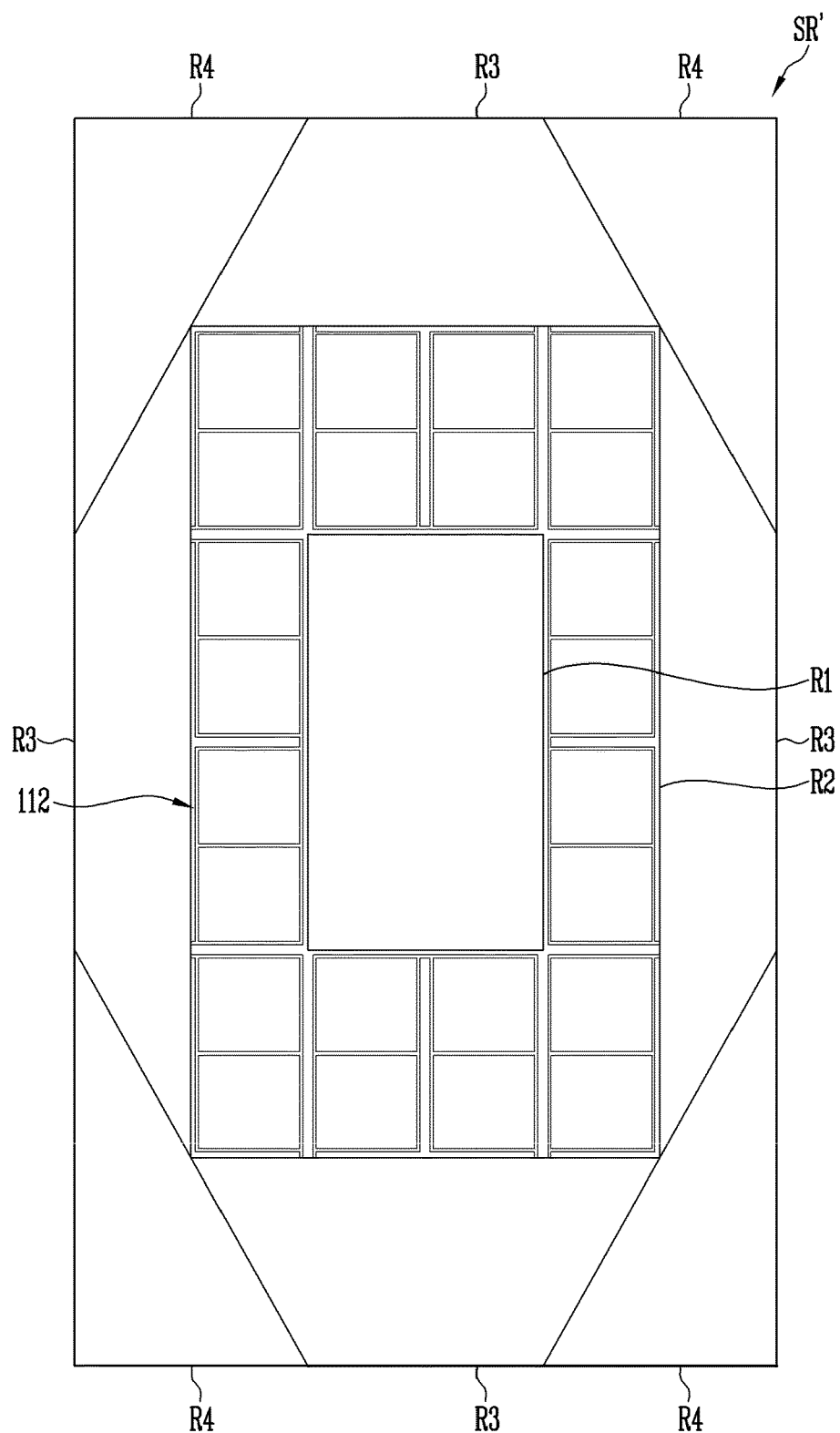
Figure 8C:
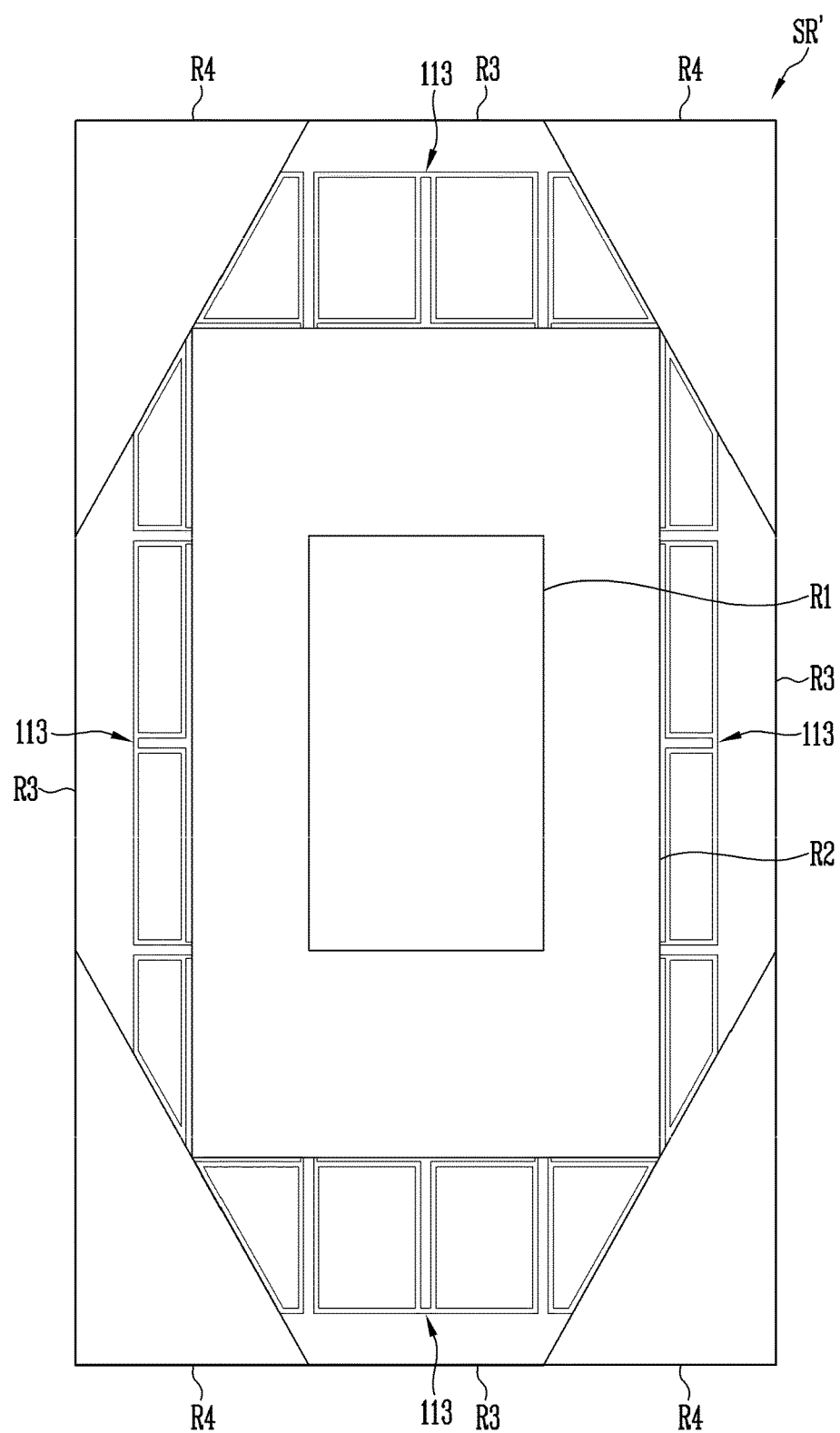
Figure 8D:
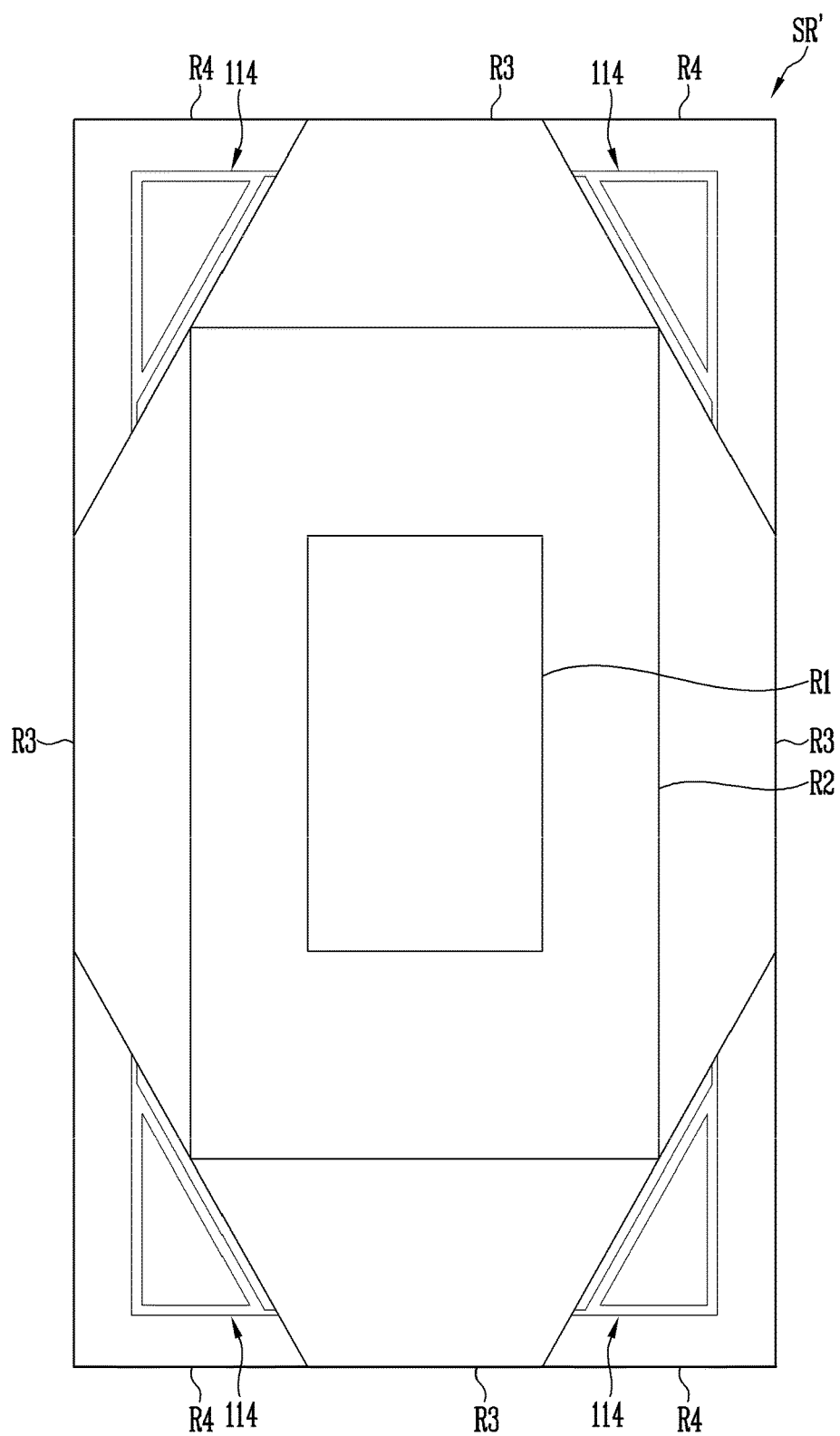

Particularly, FIG. 8A illustrates a first conductive part 111 located in a first sensing region R1, FIG. 8B illustrates a second conductive part 112 located in a second sensing region R2, FIG. 8C illustrates third conductive parts 113 located in third sensing regions R3, and FIG. 8D illustrates fourth conductive parts 114 located in fourth sensing regions R4.

Referring to FIGS. 8A to 8D, the first conductor 110 according to the exemplary embodiment of the present disclosure may include the first conductive part 111, the second conductive part 112, the third conductive parts 113, and the fourth conductive parts 114.

The first conductive part 111 is a part located in the first sensing region R1 in the first conductor 110, the second conductive part 112 is a part located in the second sensing region R2 in the first conductor 110, the third conductive part 113 is a part located in the third sensing region R3 in the first conductor 110, and the fourth conductive part 114 is a part located in the fourth sensing region R4 in the first conductor 110.

Referring to FIG. 8A, the first conductor 111 may be located in the first sensing region R1.

In this case, the first conductive part 111 may include the above-described fifth sub-conductor 350.

For example, the area ratio (%) of the first conductive part 111 with respect to the first sensing region R1 may be set to 2% to 4%.

Referring to FIG. 8B, the second conductive part 112 may be located in the second sensing region R2.

In this case, the second conductive part 112 may include portions of the other sub-conductors 310 to 340 and 360 to 390 except the fifth sub-conductor 350.

For example, the area ratio (%) of the second conductive part 112 with respect to the second sensing region R2 may be set to 6% to 8%.

Referring to FIG. 8C, the third conductive parts 113 may be located in the third sensing regions.

In this case, the third conductive parts 113 may include other portions of the other sub-conductors 310 to 340 and 360 to 390 except the fifth sub-conductor 350.

For example, the area ratio (%) of the third conductive parts 113 with respect to the third sensing regions R3 may be set to 10% to 12%.

In addition, the third sensing regions R3 may have the same area, and the third conductive parts 113 may also have the same area.

Referring to FIG. 8D, the fourth conductive parts 114 may be located in the fourth sensing regions R4.

In this case, the fourth conductive parts 114 may include a portion of the first sub-conductor 310, a portion of the third sub-conductor 330, a portion of the seventh sub-conductor 370, and a portion of the ninth sub-conductor 390.

For example, the area ratio (%) of the fourth conductive parts 114 with respect to the fourth sensing regions R4 may be set to 17% to 19%.

The area ratio (%) of each of the conductive parts 111, 112, 113, and 114 may be calculated by the following equation:

$$AR = \Delta C1/\Delta C2,$$

where AR is an area ratio (%), $\Delta C1$ is a minimum variation in capacitance that the sensor controller 150 can detect, and $\Delta C2$ is a variation in capacitance in pressurization of a conductive rod.

In addition, the variation $\Delta C2$ in capacitance in the pressurization of the conductive rod may be calculated by the following equation:

$$\Delta C2 = Er*AB*(1/T1 - 1/T2),$$

where Er is a dielectric constant of the elastic member 130, AB is an area of the conductive rod, T1 is a thickness of the elastic member 130 in the pressurization of the conductive rod, and T2 is a thickness of the elastic member 130 in a state in which there is no touch caused by the conductive rod.

In addition, the fourth sensing regions R4 may have the same area, and the fourth conductive parts 114 may also have the same area.

As described above, the area ratio of the first conductive part 111 with respect to the first sensing region R1, the area ratio of the second conductive part 112 with respect to the second sensing region R2, the area ratio of the third conductive parts 113 with respect to the third sensing regions R3, and the area ratio of the fourth conductive parts 114 with respect to the fourth sensing regions R4 are differently set, so that an error in pressure detection can be considerably reduced.

FIG. 9 is a view illustrating a first conductor according to another exemplary embodiment of the present disclosure.

Referring to FIG. 9, the first conductor 110' according to the exemplary embodiment of the present disclosure may include a plurality of sub-conductors 510, 520, 530, 540, 550, 560, 570, 580, and 590.

For example, the first conductor 110' may include first to ninth sub-conductors 510 to 590.

The first to ninth sub-conductors 510 to 590 may be electrically isolated from one another. In this case, the first to ninth sub-conductors 510 to 590 may be individually connected to the sensor controller 150.

The first sub-conductor 510 may include first to fourth conductive lines 601, 602, 603, and 604 to form a closed loop.

The first conductive line 601 may have a linear shape extending in a first direction (e.g., an X-axis direction). The fourth conductive line 604 may have a linear shape extending in a second direction (e.g., a Y-axis direction) from one end of the first conductive line 601.

The second conductive line 602 may extend long in the second direction from the other end of the first conductive line 601. The second conductive line 602 may include a plurality of concave parts 602a recessed inward.

The third conductive line 603 is connected between the second conductive line 602 and the fourth conductive line 604, and may have an uneven shape, including at least one concave part 603a.

In addition, the first sub-conductor 510 may further include a plurality of fifth conductive lines 605 located inside the first to fourth conductive lines 601 to 604, the plurality of fifth conductive lines 605 being arranged along the second direction.

Each of the fifth conductive lines 605 may have a diamond shape. Also, the fifth conductive lines 605 may be connected to the first conductive line 601 through a sixth conductive line 606, be connected to the second conductive line 602 through seventh conductive lines 607, be connected to the third conductive line 603 through an eighth conductive line 608, and be connected to the fourth conductive 604 through ninth conductive lines 609.

The second sub-conductor 520 may include first to fourth conductive lines 611, 612, 613, and 614 to form a closed loop.

The first conductive line 611 may have a linear shape extending in the first direction.

The second conductive line 612 may extend in the second direction from one end of the first conductive line 611. The second conductive line 612 may include a plurality of concave parts 612a recessed inward.

The fourth conductive line 614 may extend in the second direction from the other end of the first conductive line 611. The fourth conductive line 614 may include a plurality of concave parts 614a recessed inward.

The third conductive line 613 is connected between the second conductive line 612 and the fourth conductive line 614, and may have an uneven shape. including at least one concave part 613a.

The second sub-conductor 520 is located inside the first to fourth conductive lines 611 to 614, and may further include a plurality of fifth conductive lines 614 arranged along the second direction.

Each of the fifth conductive lines 615 may have a diamond shape. Also, the fifth conductive lines 615 may be connected to the first conductive line 611 through a sixth conductive line 616, be connected to second conductive line 612 through seventh conductive lines 627, be connected to the third conductive line 623 through an eighth conductive line 628, and be connected to the fourth conductive line 624 through ninth conductive lines 629.

The fifth sub-conductor 550 may include a plurality of ring-shaped conductive lines 631.

Each of the ring-shaped conductive lines 631 may have a polygonal shape (e.g., an octagonal shape). The ring-shaped conductive lines 631 may be attached to one another.

The sixth sub-conductor 560 has a bilaterally symmetrical shape with the fourth sub-conductor 540, and therefore, its detailed description will be omitted.

The seventh sub-conductor 570 has a bilaterally symmetrical shape with the first sub-conductor 510, and therefore, its detailed description will be omitted.

The eighth sub-conductor 580 has a bilaterally symmetrical shape with the second sub-conductor 520, and therefore, its detailed description will be omitted.

The ninth sub-conductor 590 has a bilaterally symmetrical shape with the seventh sub-conductor 570, and therefore, its detailed description will be omitted.

FIGS. 10A to 10D are views illustrating states in which the first conductor of FIG. 9 is located in sensing regions.

Figure 10A:
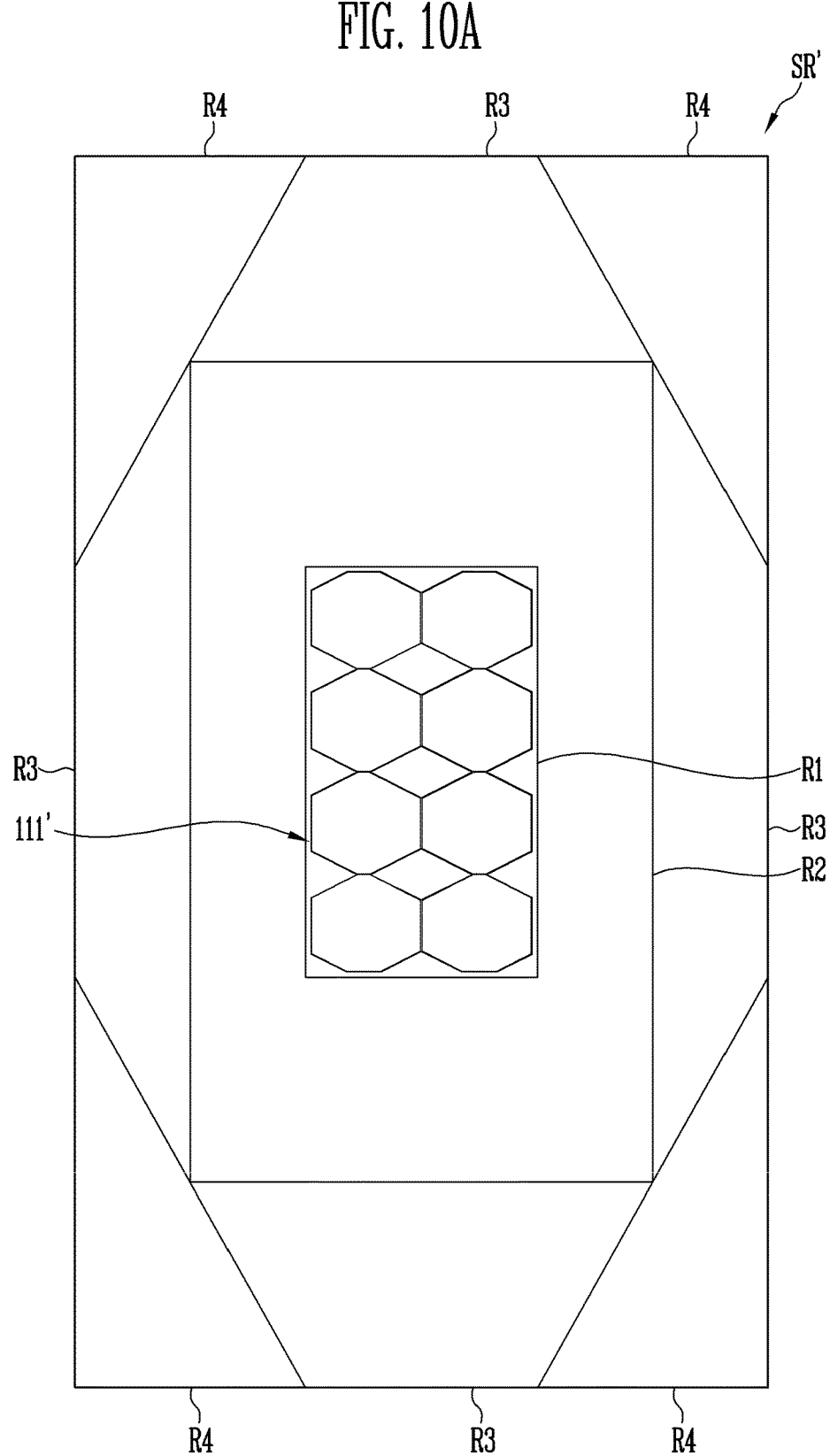
FIG. 10A, FIG. 10B, FIG. 10C, and FIG. 10D are views illustrating states in which the first conductor of FIG. 9 is located in sensing regions.
Figure 10B:
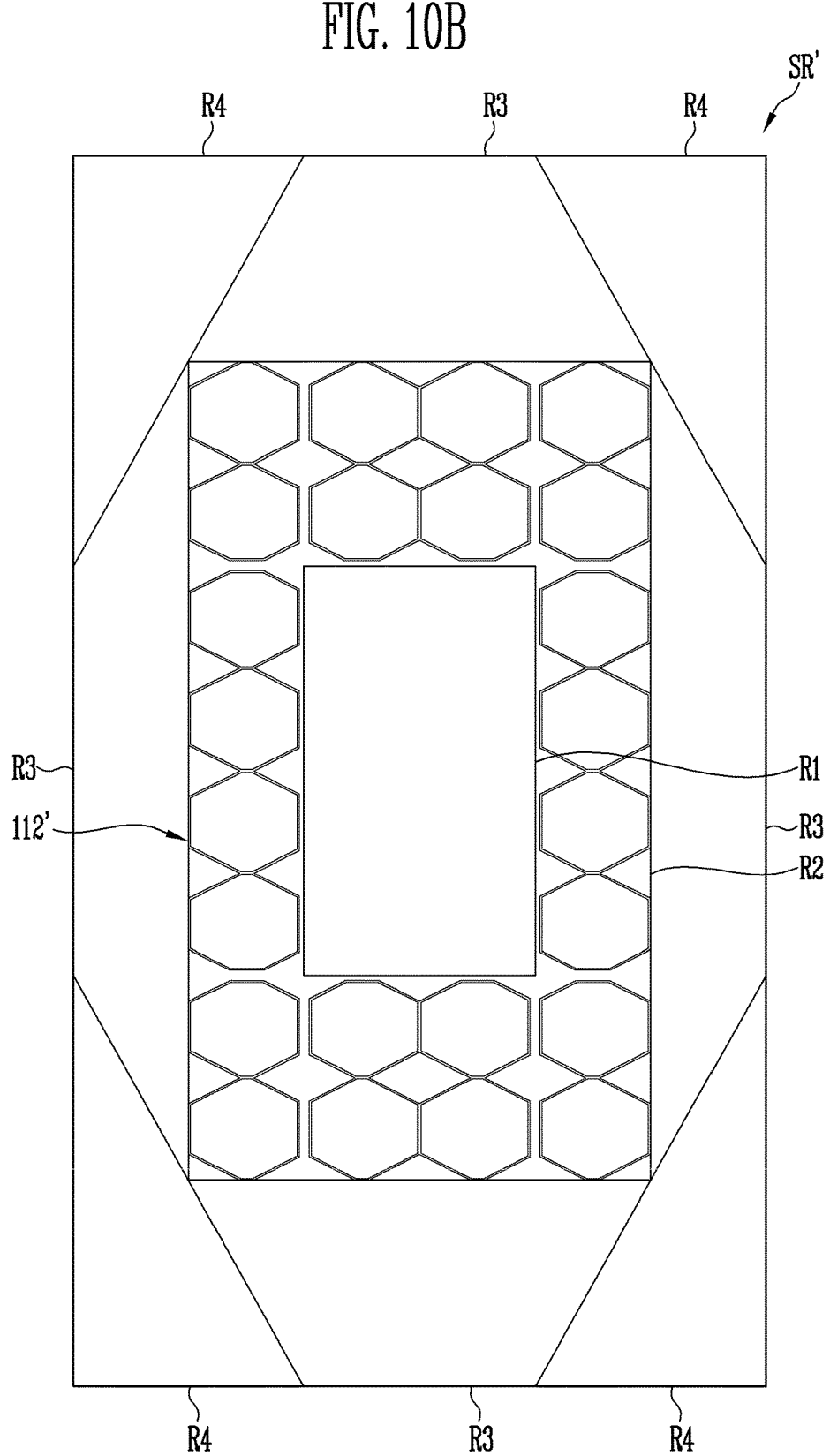
Figure 10C:
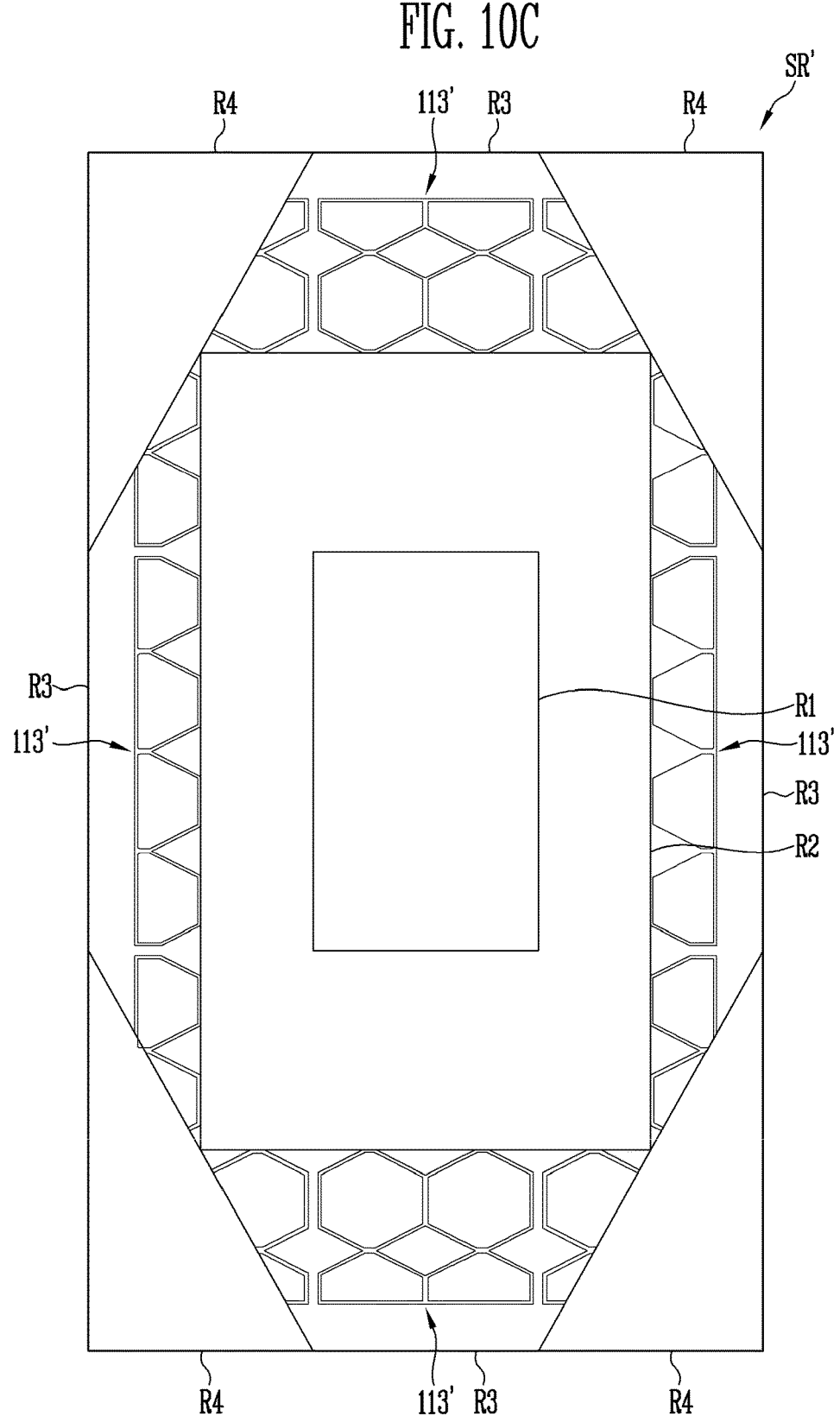
Figure 10D:
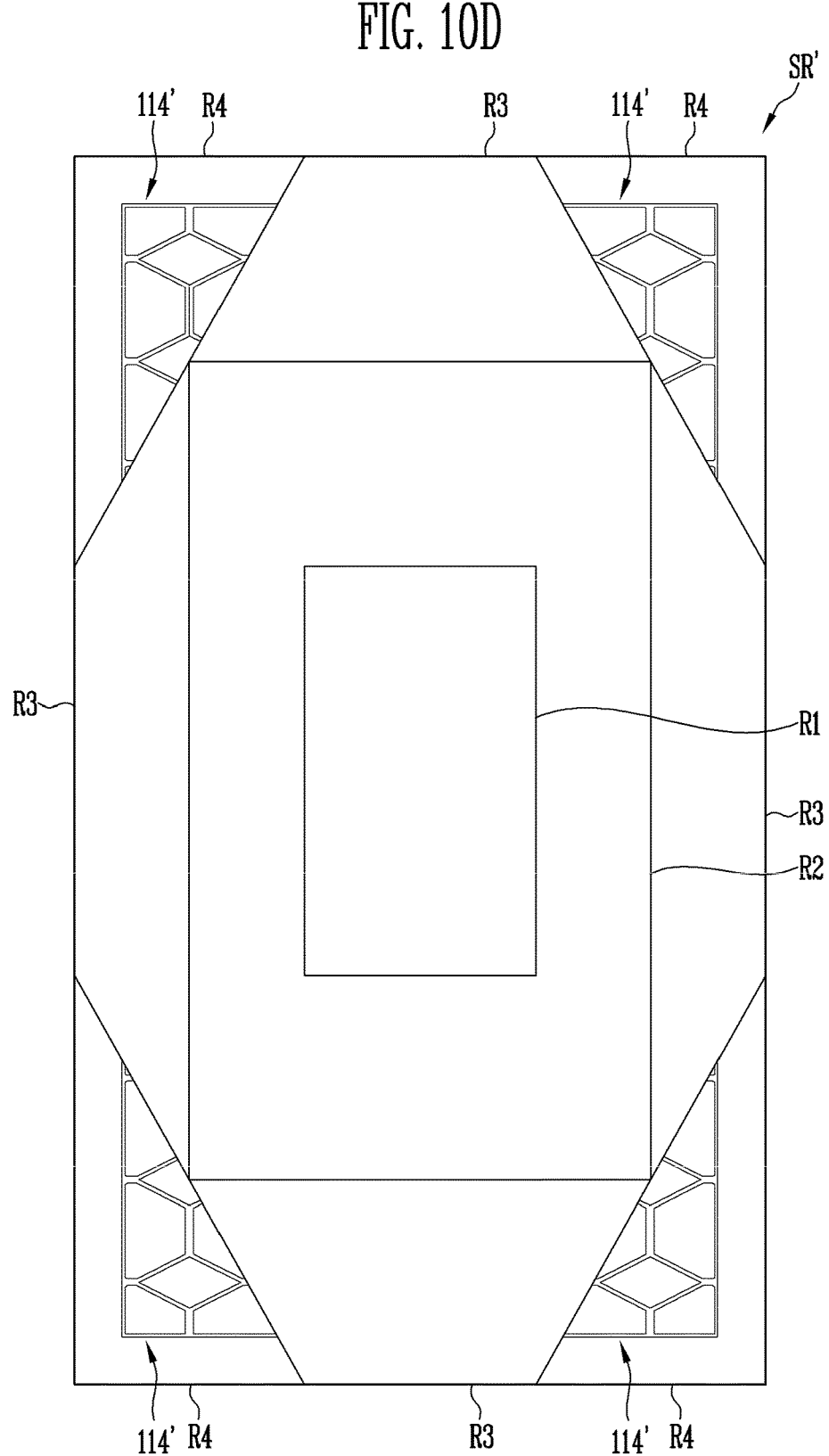

In particular, FIG. 10A illustrates a first conductive part 111' located in a first sensing region R1; FIG. 10B illustrates a second conductive part 112' located in a second sensing region R2; FIG. 10C illustrates third conductive parts 113' located in third sensing regions R3; and FIG. 10D illustrates fourth conductive parts 114' located in fourth sensing regions R4.

Referring to FIGS. 10A to 10D, the first conductor 110' according to an exemplary embodiment of the present disclosure may include the first conductive part 111', the second conductive part 112', the third conductive part 113', and the fourth conductive part 114'.

The first conductive part 111' is located in the first sensing region R1 in the first conductor 110', the second conductive part 112' is located in the second sensing region R2 in the first conductor 110', the third conductive parts 113' are located in the third sensing region R3 in the first conductor 110', and the fourth conductive parts 114' are located in the fourth sensing region R4 in the first conductor 110'.

Referring to FIG. 10A, the first conductive part 111' may be located in the first sensing region R1.

In this case, the first conductive part 111' may include the above-described fifth sub-conductor 550.

For example, the area ratio (%) of the first conductive part 111' with respect to the first sensing region R1 may be set to 2% to 4%.

Referring to FIG. 10B, the second conductive part 112' may be located in the second sensing region R2.

In this case, the second conductive part 112' may include portions of the other sub-conductors 510 to 540 and 560 to 590 except the fifth sub-conductor 550.

For example, the area ratio (%) of the second conductive part 112' with respect to the second sensing region R2 may be set to 6% to 8%.

Referring to FIG. 10C, the third conductive parts 113' may be located in the third sensing regions R3.

In this case, the third conductive parts 113' may include other portions of the other sub-conductors 510 to 540 and 560 to 590 except the fifth sub-conductor 550.

For example, the area ratio (%) of the third conductive parts 113' with respect to the third sensing regions R3 may be set to 10% to 12%.

In addition, the third sensing regions R3 may have the same area, and the third conductive parts 113' may also have the same area.

Referring to FIG. 10D, the fourth conductive parts 114' may be located in the fourth sensing regions R4.

In this case, the fourth conductive parts 114' may include a portion of the first sub-conductor 510, a portion of the third sub-conductor 530, a portion of the seventh sub-conductor 570, and a portion of the ninth sub-conductor 590.

For example, the area ratio (%) of the fourth conductive parts 114' with respect to the fourth sensing regions R4 may be set to 17% to 19%.

In addition, the fourth sensing regions R4 may have the same area, and the fourth conductive parts 114' may also have the same area.

As described above, the area ratio of the first conductive part 111' with respect to the first sensing region R1, the area ratio of the second conductive part 112' with respect to the second sensing region R2, the area ratio of the third conductive parts 113' with respect to the third sensing regions R3, and the area ratio of the fourth conductive parts 114' with respect to the fourth sensing regions R4 are set differently, so that an error in pressure detection can be considerably reduced.

Figure 11:
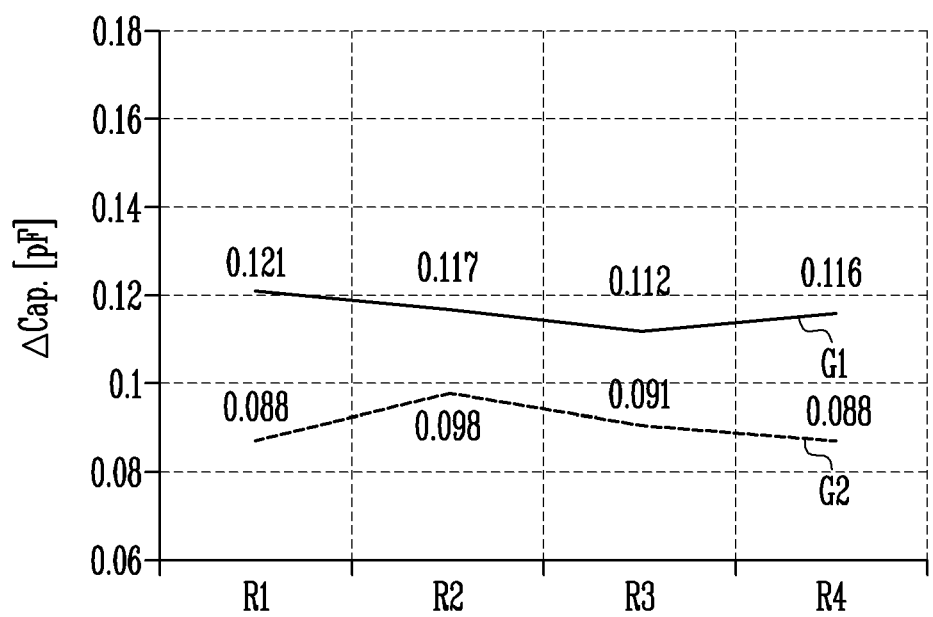
FIG. 11 is a graph illustrating experimental examples of pressure sensors employing the first conductors shown in FIGS. 7 and 9.

FIG. 11 is a graph illustrating experimental examples of pressure sensors employing the first conductors shown in FIGS. 7 and 9.

In particular, a first line G1 represents an experimental result when the first conductor 110 of FIG. 7 is employed; and a second line G2 represents an experimental result when the first conductor 110' of FIG. 9 is employed.

The area ratio (%) of the first conductive part 111 or 111' with respect to the first sensing region R1 was set to 3.35%; the area ratio (%) of the second conductive part 112 or 112' with respect to the second sensing region R2 was set to 7.01%; the area ratio (%) of the third conductive parts 113 or 113' with respect to the third sensing regions R3 was set to 10.67%; and the area ratio (%) of the fourth conductive parts 114 or 114' with respect to the fourth sensing regions R4 was set to 17.90%.

After that, the same pressure was applied to each of the sensing regions R1, R2, R3, and R4, and a variation (ΔCap) in capacitance for each of the sensing regions R1, R2, R3, and R4 was measured.

Referring to the first line G1, a maximum difference between variations (ΔCap) in capacitance is about 0.009 pF. Therefore, in the case of the pressure sensor employing the first conductor 110 of FIG. 7, an error in pressure detection becomes very small.

Referring to the second line G2, a maximum difference between variations (ΔCap) in capacitance is about 0.010 pF. Therefore, in the case of the pressure sensor employing the first conductor 110' of FIG. 9, an error in pressure detection also becomes very small.

Figure 12:
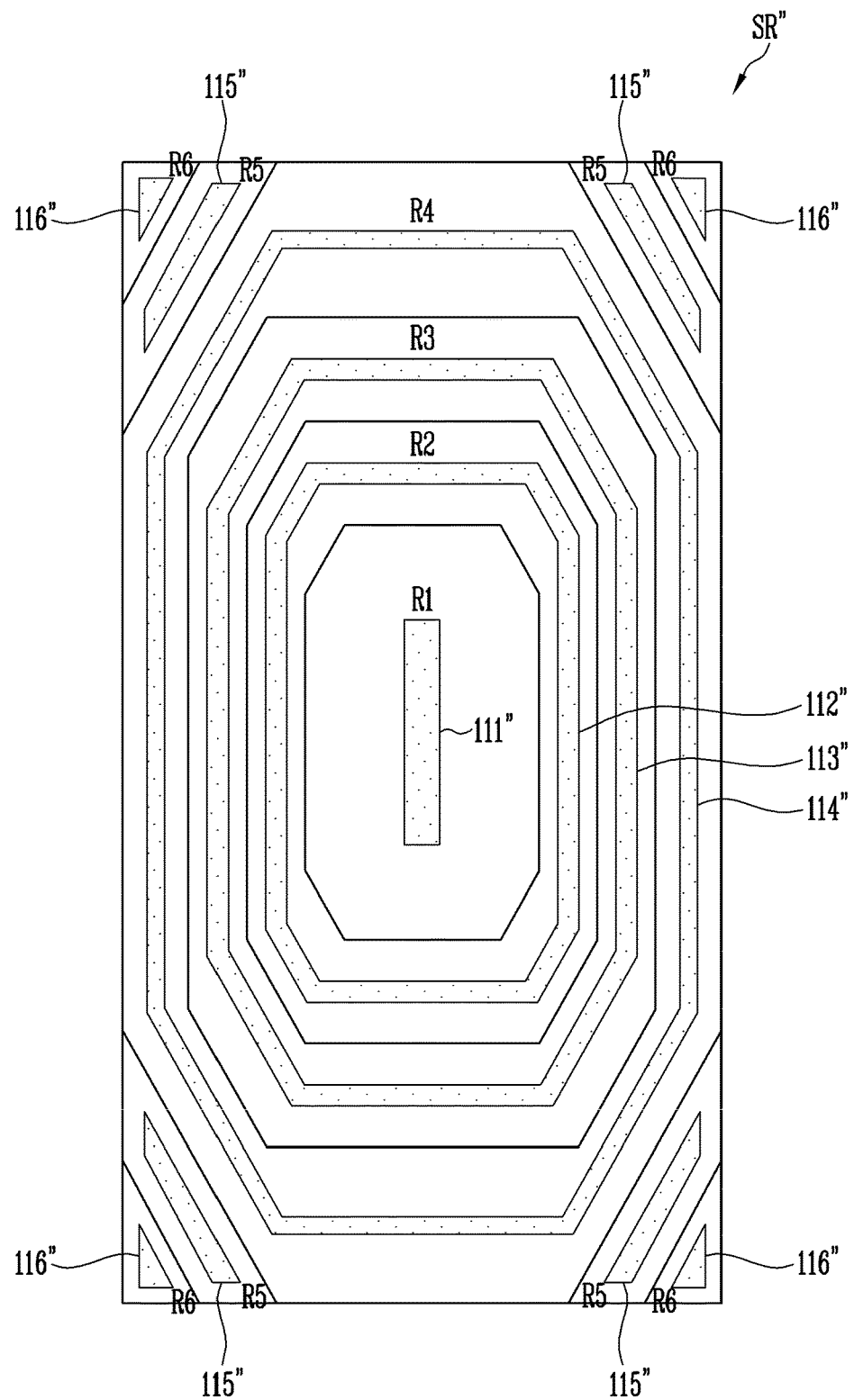
FIG. 12 is a view illustrating a pressure sensing region of the pressure sensor according to still another exemplary embodiment of the present disclosure.

FIG. 12 is a view illustrating a pressure sensing region of the pressure sensor according to still another exemplary embodiment of the present disclosure.

Referring to FIG. 12, the pressure sensor 100 according to an exemplary embodiment of the pressure sensor may include a pressure sensing region" divided into a plurality of sensing regions R1, R2, R3, R4, R5, and R6.

In this case, the sensing regions R1, R2, R3, R4, R5, and R6 may be divided based on a pressing amount of the elastic member 130, and the pressure sensing region SR" may have a quadrangular shape.

For example, the pressure sensing region SR" may include a first sensing region R1, a second sensing region R2, a third sensing region R3, a fourth sensing region R4, fifth sensing regions R5, and sixth sensing regions R6.

The first sensing region R1 is a region located at the center of the pressure sensing region SR". When the same pressure is applied, the variation in thickness of the elastic member 130 in the first sensing region R1 may be greatest as compared with the other sensing regions R2, R3, R4, R5, and R6.

In addition, the first sensing region R1 may have a polygonal shape (e.g., an octagonal shape), and a first conductive part 111" may be located in the first sensing region R1.

The second sensing region R2 is a region located at the periphery of the first sensing region R1. When the same pressure is applied, the variation in thickness of the elastic member 130 in the second sensing region R2 is small as compared with the first sensing region R1, but may be large as compared with other sensing regions R3, R4, R5, and R6.

In addition, the second sensing region R2 may have a polygonal shape (e.g., an octagonal shape) surrounding the first sensing region R1, and a second conductive part 112" may be located in the second sensing region R2.

The third sensing region R3 is a region located at the periphery of the second sensing region R2. When the same pressure is applied, the variation in thickness of the elastic member 130 in the third sensing region R3 is small as compared with the second sensing region R2, but may be large as compared with other sensing regions R4, R5, and R6.

In addition, the third sensing region may have a polygonal shape (e.g., an octagonal shape) surrounding the second sensing region R2, and a third conductive part 113" may be located in the third sensing region R3.

The fourth sensing region R4 is a region located at the periphery of the third sensing region R3. When the same pressure is applied, the variation in thickness of the elastic member 130 in the fourth sensing region R4 is small as compared with the third sensing region R3, but may be large as compared with other sensing regions R5, and R6.

In addition, the fourth sensing region R4 may have a polygonal shape (e.g., an octagonal shape) surrounding the third sensing region R3, and a fourth conductive part 114" may be located in the fourth sensing region R4.

The fifth sensing regions R5 are four regions respectively located adjacent to corners of the pressure sensing region SR", and may exist between the fourth sensing region SR and the sixth sensing regions R6.

The fifth sensing regions R5 partially receive a fixing force caused by the support member of the pressure sensor 100. Therefore, when the same pressure is applied, the variation in thickness of the elastic member 130 in the fifth sensing regions R5 is small as compared with the fourth sensing region R4, but may be large as compared with the sixth sensing regions R6.

In addition, each of the fifth sensing regions R5 may have a trapezoidal shape, and fifth conductive parts 115" may be located in the fifth sensing regions R5, respectively.

The sixth sensing regions R6 are four regions respectively located at the corners of the pressure sensing region SR", and may receive the greatest fixing force caused by the support member of the pressure sensor 100. Therefore, when the same pressure is applied, the variation in thickness of the elastic member 130 in the sixth sensing regions R6 may be smallest as compared with the other sensing regions R1, R2, R3, R4, and R5.

In addition, each of the sixth sensing regions R6 may have a triangular shape, and sixth conductive parts 116" may be located in the sixth sensing regions R6.

The area ratios of the conductive parts 111", 112", 113", 114", 115", and 116" with respect to the respective sensing regions R1, R2, R3, R4, R5, and R6 may be differently set such that the variations in capacitance generated in the respective sensing regions R1, R2, R3, R4, R5, and R6 are set to be about equal to one another.

Specifically, the area ratio of the first conductive part 111" with respect to the first sensing region R1, the area ratio of the second conductive part 112" with respect to the second sensing region R2, the area ratio of the third conductive parts 113" with respect to the third sensing regions R3, the area ratio of the fourth conductive part 114" with respect to the fourth sensing region R4, the area ratio of the fifth conductive parts 115" with respect to the fifth sensing regions R5, and the area ratio of the sixth conductive parts 116" with respect to the sixth sensing regions R6 may be set different from one another.

For example, the area ratio of the first conductive part 111" with respect to the first sensing region R1, the area ratio of the second conductive part 112" with respect to the second sensing region R2, the area ratio of the third conductive parts 113" with respect to the third sensing regions R3, the area ratio of the fourth conductive part 114" with respect to the fourth sensing region R4, the area ratio of the fifth conductive parts 115" with respect to the fifth sensing regions R5, and the area ratio of the sixth conductive parts 116" with respect to the sixth sensing regions R6 may sequentially increase.

That is, the area ratio of the second conductive part 112" with respect to the second sensing region R2 may be set greater than the area ratio of the first conductive part 111" with respective to the first sensing region R1; the area ratio of the third conductive part 113" with respect to the third sensing region R3 may be set greater than the area ratio of the second conductive part 112" with respective to the second sensing region R2; and the area ratio of the fourth conductive part 114" with respect to the fourth sensing region R4 may be set greater than the area ratio of the third conductive part 113" with respect to the third sensing region R3.

In addition, the area ratio of the fifth conductive parts 115" with respect to the fifth sensing regions R5 may be set greater than the area ratio of the fourth conductive part 114" with respect to the fourth sensing region R4; and the area ratio of the sixth conductive parts 116" with respect to the sixth sensing regions R6 may be set greater than the area ratio of the fifth conductive parts 115" with respect to the fifth sensing regions R5.

Figure 13:
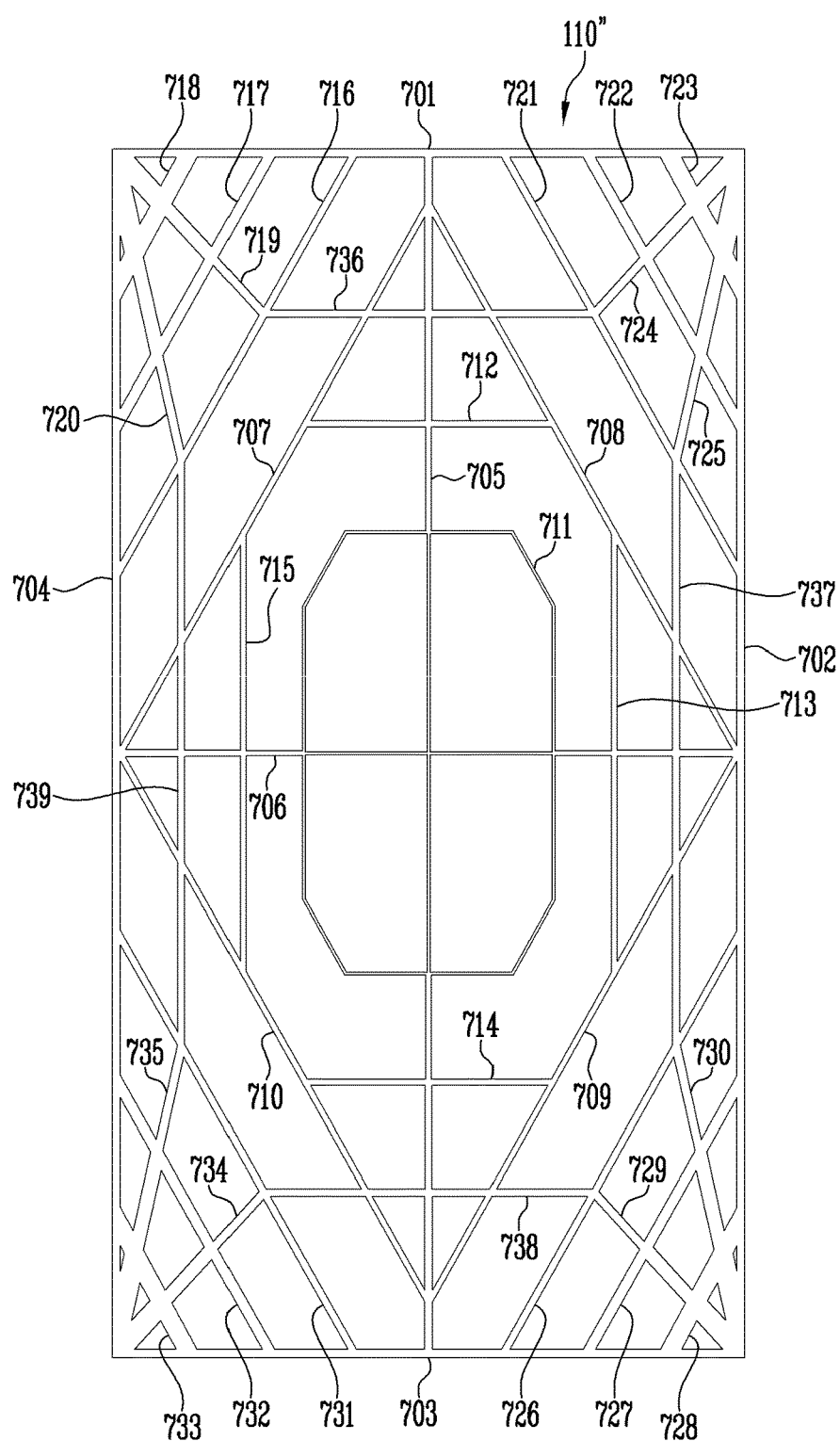
FIG. 13 is a view illustrating a first conductor according to still another exemplary embodiment of the present disclosure.

FIG. 13 is a view illustrating a first conductor according to still another exemplary embodiment of the present disclosure.

Referring to FIG. 13, the first conductor 110" according to an exemplary embodiment of the present disclosure may include first to fourth conductive lines 701, 702, 703, and 704 constituting a quadrangle, and a fifth conductive line 705 and a sixth conductive line 706, which divide the quadrangle configured with the first to fourth conductive lines 701 to 704 into quarters.

For example, the fifth conductive line 705 may be connected between the center of the first conductive line 701 and the center of the third conductive line 703, and the sixth conductive line 706 may be connected between the center of the second conductive line 702 and the center of the fourth conductive line 704.

In addition, the first conductor 110" may further include seventh to tenth conductive lines 707, 708, 709, and 710 constituting a diamond.

The fifth conductive line 705 may be connected to upper and lower vertexes of the diamond configured with the seventh to tenth conductive lines 707 to 710, and the sixth conductive line 706 may be connected to left and right vertexes of the diamond.

In addition, the first conductor 110″ may further include an eleventh conductive line 711 located inside the diamond configured with the seventh to tenth conductive lines 707 to 710.

The eleventh conductive line 711 may form a closed loop. The eleventh conductive line 711 may have a polygonal shape (e.g., an octagonal shape).

In addition, the first conductor 110″ may further include a twelfth conductive line 712 connected between the seventh conductive line 707 and the eighth conductive line 708, a thirteenth conductive line 713 connected between the eighth conductive line 708 and the ninth conductive line 709, a fourteenth conductive line 714 connected between the ninth conductive line 709 and the tenth conductive line 710, and a fifteenth conductive line 715 connected between the tenth conductive line 710 and the seventh conductive line 707.

In addition, the first conductor 110″ may further include a sixteenth conductive line 716, a seventeenth conductive line 717, and an eighteenth conductive line 718, each of which is connected between the first conductive line 701 and the fourth conductive line 704.

The sixteenth conductive line 716, the seventeenth conductive line 717, and the eighteenth conductive line 718 may extend to have a predetermined inclination, and may be spaced apart from one another. Also, the widths of the sixteenth conductive line 716, the seventeenth conductive line 717, and the eighteenth conductive line 718 may sequentially increase.

The sixteenth conductive line 716, the seventeenth conductive line 717, and the eighteenth conductive line 718 may be parallel to the seventh conductive line 707.

In addition, the first conductor 110″ may further include a nineteenth conductive line 719 and the twentieth conductive line 720, each of which extends from an intersection point of the first conductive line 701 and the fourth conductive line 704 to the sixteenth conductive line 716.

The nineteenth conductive line 719 and the twentieth conductive line 720 may pass through the seventeenth conductive line 717 and the eighteenth conductive line 718. The nineteenth conductive line 719 and the twentieth conductive line 720 may have inclinations different from each other.

In addition, the first conductor 110″ may further include a twenty-first conductive line 721, a twenty-second conductive line 722, and a twenty-third conductive line 723, each of which is connected between the first conductive line 701 and the second conductive line 702.

The twenty-first conductive line 721, the twenty-second conductive line 722, and the twenty-third conductive line 723 may extend to have a predetermined inclination, and may be spaced apart from one another. Also, the widths of the twenty-first conductive line 721, the twenty-second conductive line 722, and the twenty-third conductive line 723 may sequentially increase.

The twenty-first conductive line 721, the twenty-second conductive line 722, and the twenty-third conductive line 723 may be parallel to the eighth conductive line 708.

In addition, the first conductor 110″ may further include a twenty-fourth conductive line 724 and a twenty-fifth conductive line 725, each of which extends from an intersection point of the first conductive line 701 and the second conductive line 702 to the twenty-first conductive line 721.

The twenty-fourth conductive line 724 and the twenty-fifth conductive line 725 may pass through the twenty-second conductive line 722 and the twenty-third conductive line 723. The twenty-fourth conductive line 724 and the twenty-fifth conductive line 725 may have inclinations different from each other.

In addition, the first conductor 110″ may further include a twenty-sixth conductive line 726, a twenty-seventh conductive line 727, and a twenty-eighth conductive line 728, each of which is connected between the second conductive line 702 and the third conductive line 703.

The twenty-sixth conductive line 726, the twenty-seventh conductive line 727, and the twenty-eighth conductive line 728 may extend to have a predetermined inclination, and may be spaced apart from one another. Also, the widths of the twenty-sixth conductive line 726, the twenty-seventh conductive line 727, and the twenty-eighth conductive line 728 may sequentially increased.

The twenty-sixth conductive line 726, the twenty-seventh conductive line 727, and the twenty-eighth conductive line 728 may be parallel to the ninth conductive line 709.

In addition, the first conductor 110″ may further include a twenty-ninth conductive line 729 and the thirtieth conductive line 730, each of which extends from an intersection point of the second conductive line 702 and the third conductive line 703 to the twenty-sixth conductive line 726.

The twenty-ninth conductive line 729 and the thirtieth conductive line 730 may pass through the twenty-seventh conductive line 727 and the twenty-eighth conductive line 728. The twenty-ninth conductive line 729 and the thirtieth conductive line 730 may have inclinations different from each other.

In addition, the first conductor 110″ may further include a thirty-first conductive line 731, a thirty-second conductive line 732, and a thirty-third conductive line 733, each of which is connected between the third conductive line 703 and the fourth conductive line 704.

The thirty-first conductive line 731, the thirty-second conductive line 732, and the thirty-third conductive line 733 may extend to have a predetermined inclination, and may be spaced part from one another. Also, the widths of the thirty-first conductive line 731, the thirty-second conductive line 732, and the thirty-third conductive line 733 may sequentially increase.

The thirty-first conductive line 731, the thirty-second conductive line 732, and the thirty-third conductive line 733 may be parallel to the tenth conductive line 710.

In addition, the first conductor 110″ may further include a thirty-fourth conductive line 734 and a thirty-fifth conductive line 735, each of which extends from an intersection point of the third conductive line 703 and the fourth conductive line 704.

The thirty-fourth conductive line 734 and the thirty-fifth conductive line 735 may pass through the thirty-second conductive line 732 and the thirty-third conductive line 733. The thirty-fourth conductive line 734 and the thirty-fifth conductive line 735 may have inclinations different from each other.

In addition, the first conductor 110″ may include a thirty-sixth conductive line 736, a thirty-seventh conductive line 737, a thirty-eighth conductive line 738, and a thirty-ninth conductive line 739.

The thirty-sixth conductive line 736 may extend from an intersection point of the sixteenth conductive line 716 and the nineteenth conductive line 719 to an intersection point of the twenty-first conductive line 721 and the twenty-fourth conductive line 724.

The thirty-sixth conductive line 736 may pass through the seventh conductive line 707, the fifth conductive line 705, and the eighth conductive line 708.

The thirty-seventh conductive line 737 may extend from an intersection point of the twenty-first conductive line 721 and the twenty-fifth conductive line 725 to an intersection point of the twenty-sixth conductive line 726 and the thirtieth conductive line 730.

The thirty-seventh conductive line 737 may pass through the eighth conductive line 708, the sixth conductive line 706, and the ninth conductive line 709.

The thirty-eighth conductive line 738 may extend from an intersection point of the twenty-sixth conductive line 726 and the twenty-ninth conductive line 729 to an intersection point of the thirty-first conductive line 731 and the thirty-fourth conductive line 734.

The thirty-eighth conductive line 738 may pass through the ninth conductive line 709, the fifth conductive line 705, and the tenth conductive line 710.

The thirty-ninth conductive line 739 may extend from an intersection point of the thirty-first conductive line 731 and the thirty-fifth conductive line 735 to an intersection point of the sixteenth conductive line 716 and the twentieth conductive line 720.

The thirty-ninth conductive line 739 may pass through the tenth conductive line 710, the sixth conductive line 706, and the seventh conductive line 707.

FIGS. 14A to 14F are views illustrating states in which the first conductor of FIG. 13 is located in sensing regions.

Figure 14A:
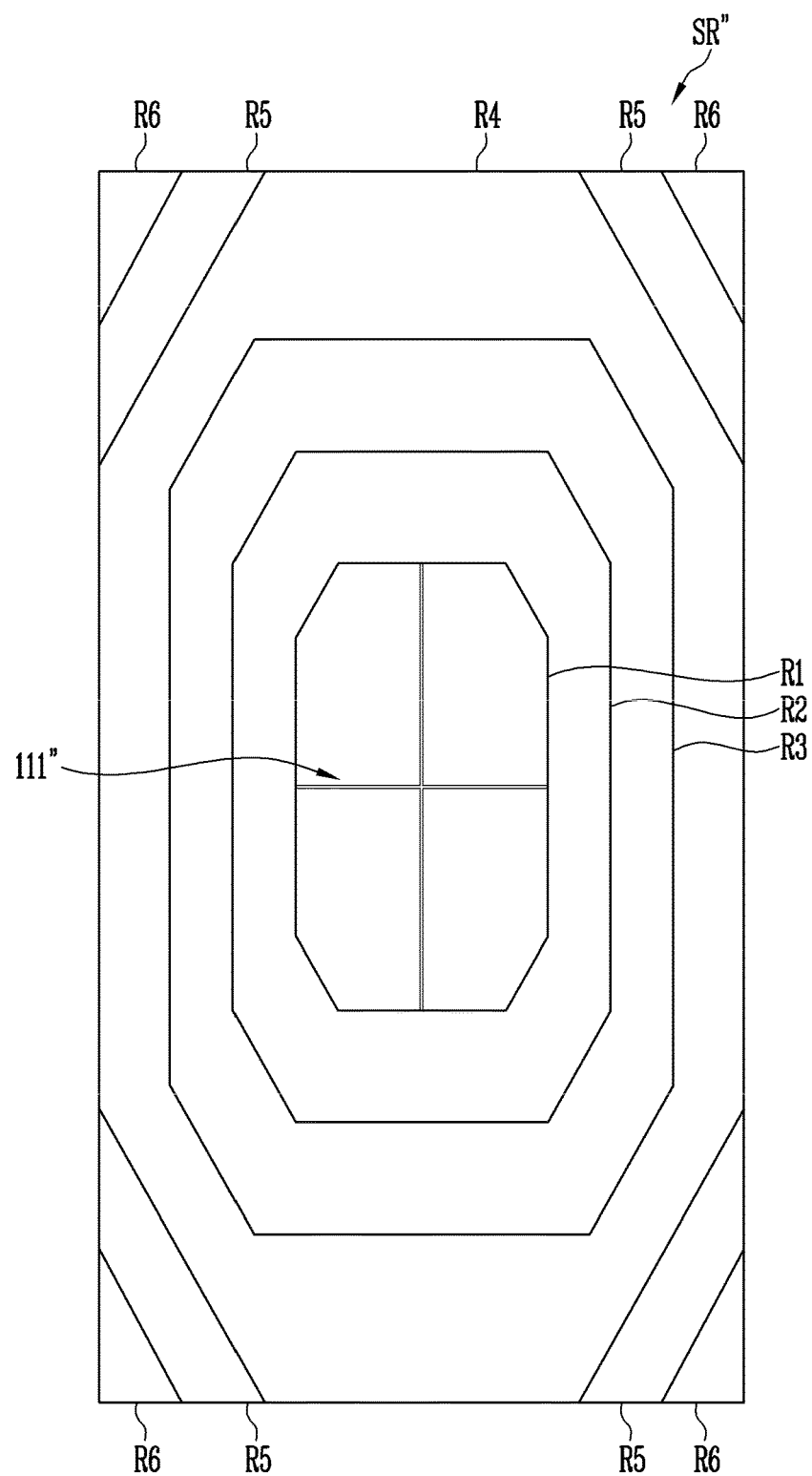
FIG. 14A, FIG. 14B, FIG. 14C, FIG. 14D, FIG. 14E, and FIG. 14F are views illustrating states in which the first conductor of FIG. 13 is located in sensing regions.
Figure 14B:
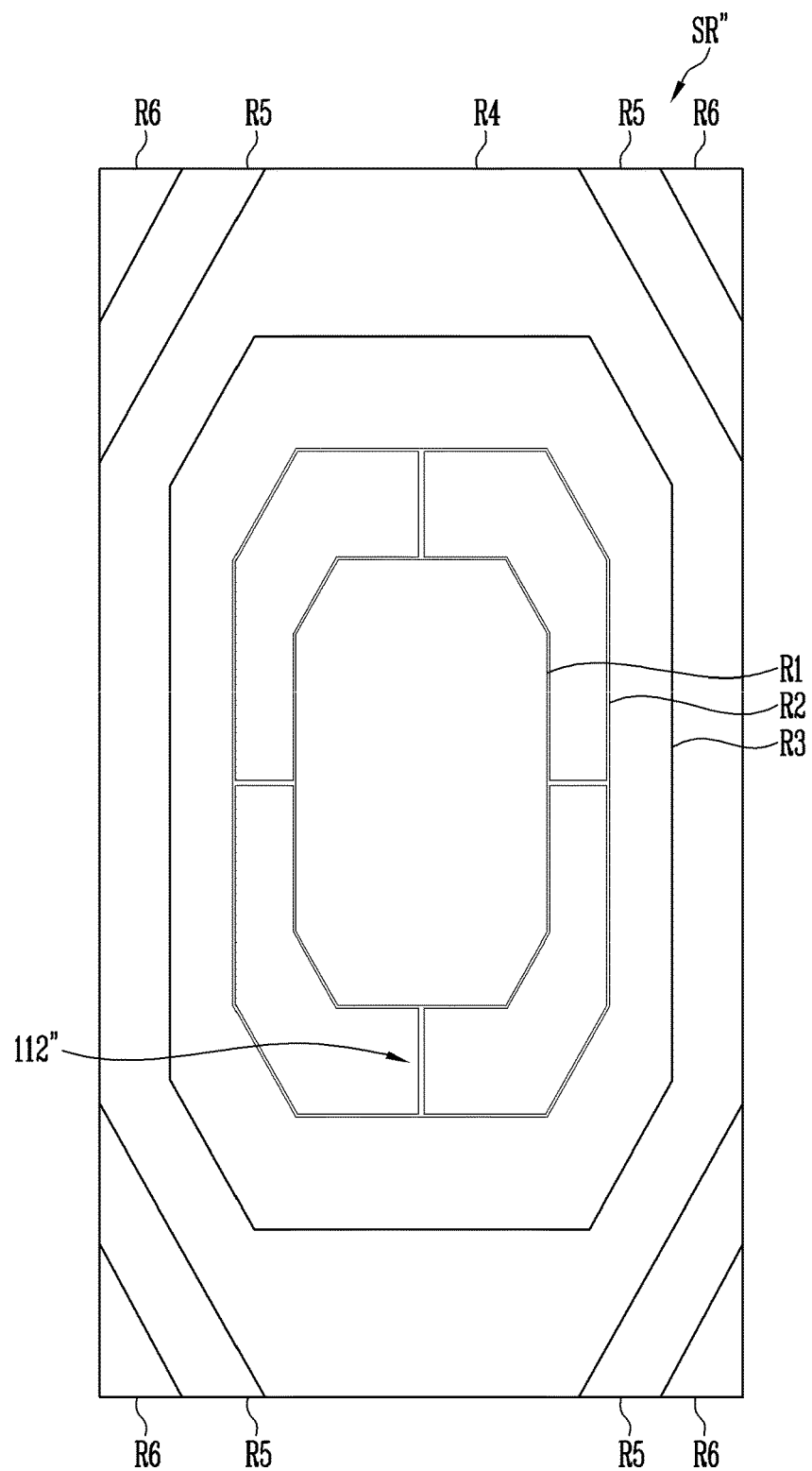
Figure 14C:
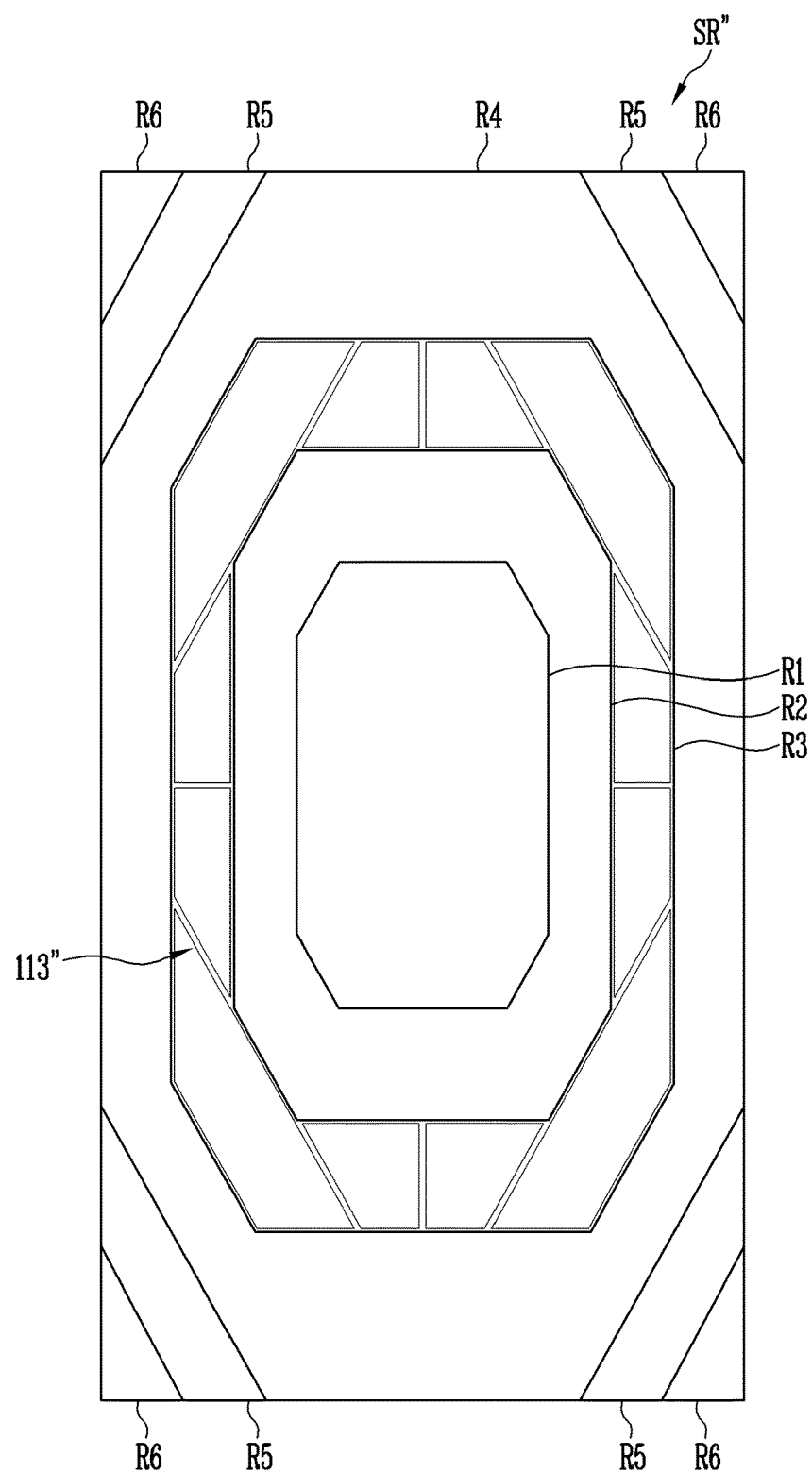

In particular, FIG. 14A illustrates a first conductive part 111" located in a first sensing region R1, FIG. 14B illustrates a second conductive part 112" located in a second sensing region R2, and FIG. 14C illustrates a third conductive part 113" located in a third sensing region R3.

Figure 14D:
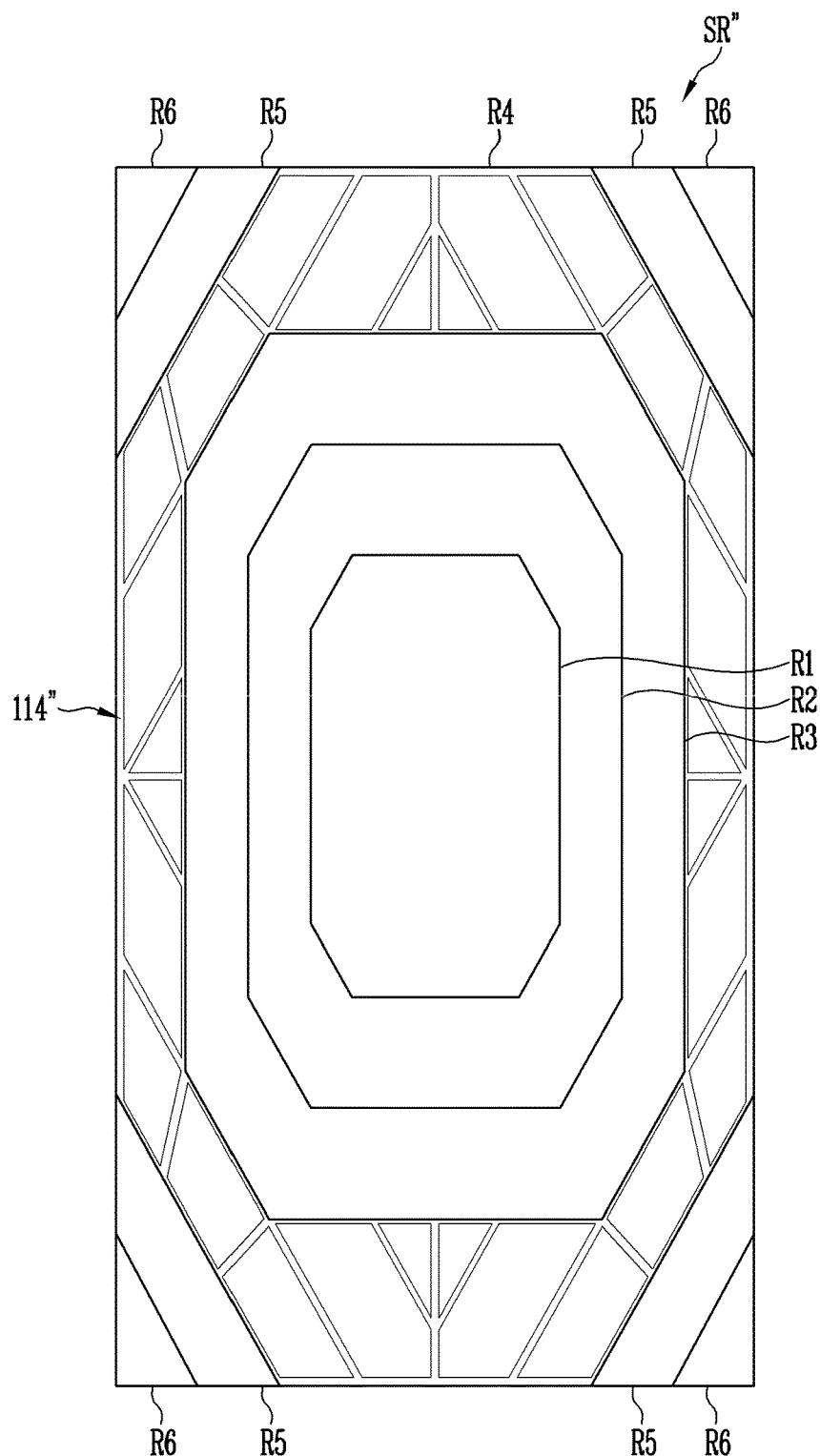
Figure 14E:
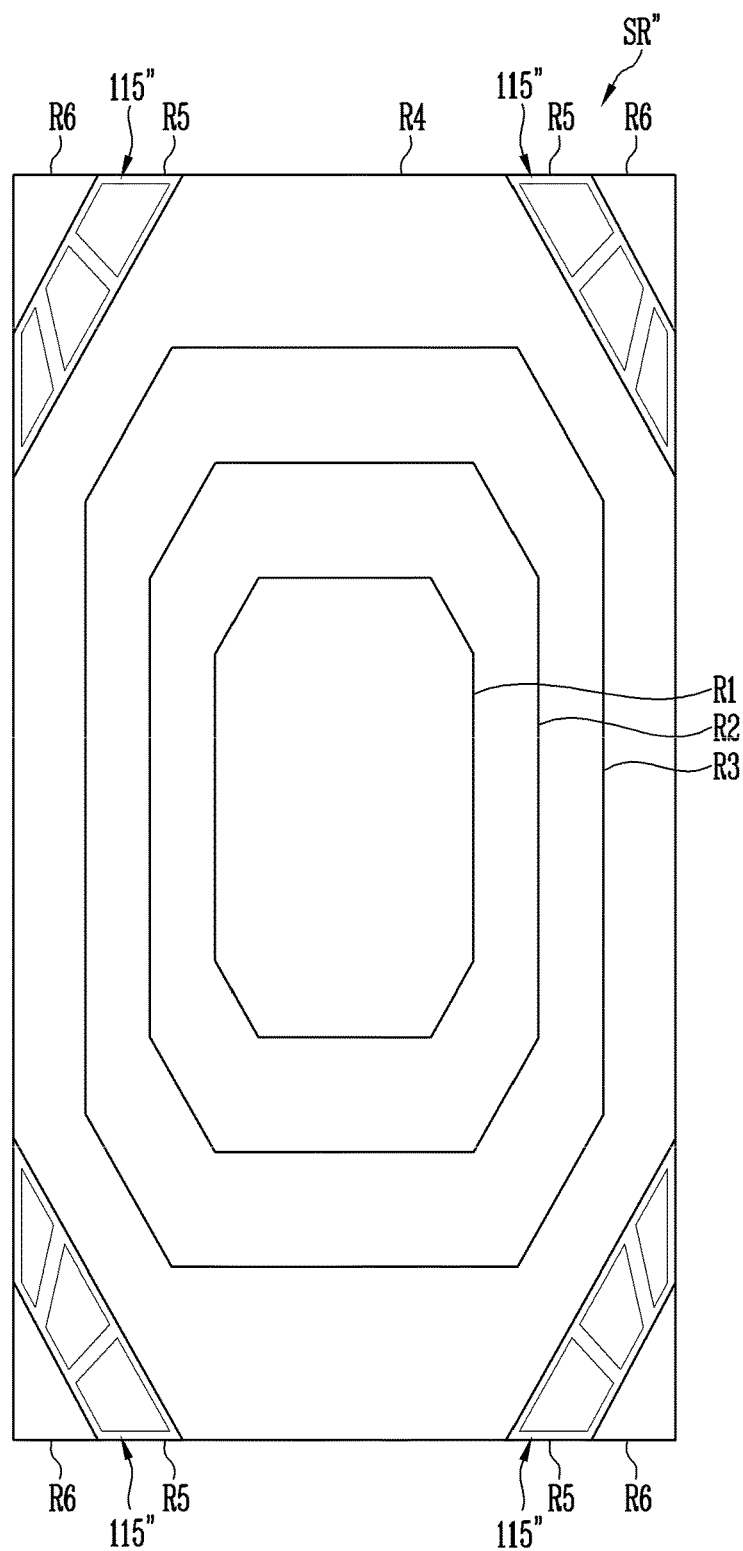
Figure 14F:
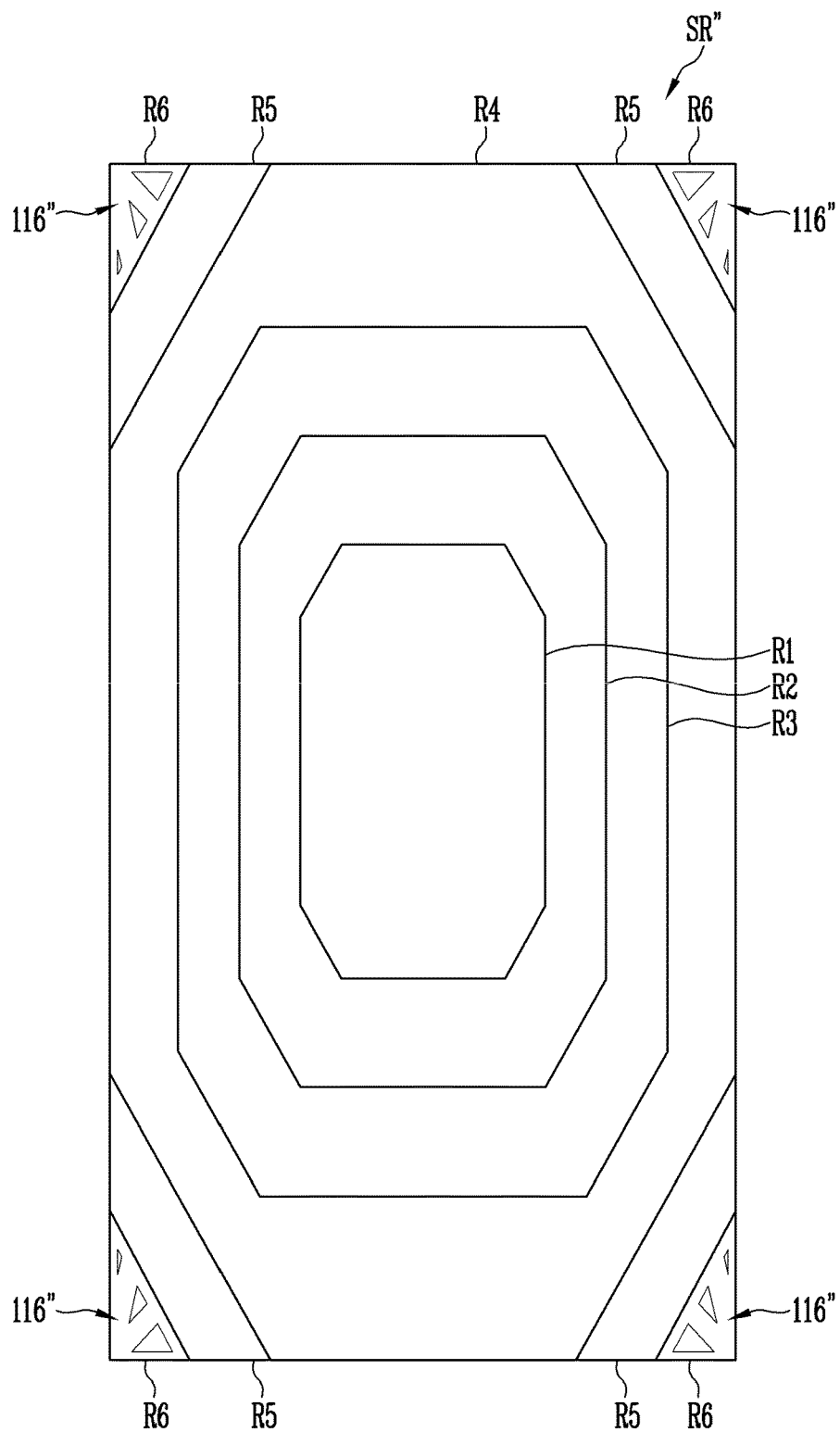

In addition, FIG. 14D illustrates a fourth conductive part 114" located in a fourth sensing region R4, FIG. 14E illustrates fifth conductive parts 115" located in fifth sensing regions R5, and FIG. 14F illustrates sixth conductive parts 116" located in sixth sensing regions R6.

Referring to FIGS. 14A to 14F, the first conductive part 110" may include the first conductive part 111", the second conductive part 112", the third conductive part 113", the fourth conductive part 114", the fifth conductive parts 115", and the sixth conductive parts 116".

The first conductive part 111" is located in the first sensing region R1 in the first conductor 110"; the second conductive part 112" is located in the second sensing region R2 in the first conductor 110"; and the third conductive part 113" is located in the third region R3 in the first conductor 110".

In addition, the fourth conductive part 114" is located in the fourth sensing region R4 in the first conductor 110"; the fifth conductive part 115" is located in the fifth sensing region R5 in the first conductor 110"; and the sixth conductive part 116" is located in the sixth sensing region R6 in the first conductive part 110".

Referring to FIG. 14A, the first conductive part 111" may be located in the first sensing region R1.

In this case, the first conductive part 111" may include portions of the conductive lines 705 and 706.

For example, the area ratio (%) of the first conductive part 111" with respect to the first sensing region R1 may be set to 2% to 4%.

Referring to FIG. 14B, the second conductive part 112" may be located in the second sensing region R2.

In this case, the second conductive part 112" may include portions of the conductive lines 705, 706, and 711 to 715.

For example, the area ratio (%) of the second conductive part 112" with respect to the second sensing region R2 may be set to 6% to 8%.

Referring to FIG. 14C, the third conductive part 113" may be located in the third sensing region R3.

In this case, the third conductive part 113" may include portions of the conductive lines 705 to 710, 712 to 716, 721, 726, 731, and 736 to 739.

For example, the area ratio (%) of the third conductive part 113" with respect to the third sensing region R3 may be set to 10% to 12%.

Referring to FIG. 14D, the fourth conductive part 114" may be located in the fourth sensing region R4.

In this case, the fourth conductive part 114" may include portions of the conductive lines 701 to 710, 716, 717, 719 to 721, 722, 724 to 727, 729 to 732, and 734 to 739.

For example, the area ratio (%) of the fourth conductive part 114" with respect to the fourth sensing region R4 may be set to 13% to 15%.

Referring to FIG. 14E, the fifth conductive parts 115" may be located in the fifth sensing regions R5.

In this case, the fifth conductive parts 115" may include portions of the conductive lines 701 to 704, 717 to 720, 722 to 725, 727 to 730, and 732 to 735.

For example, the area ratio (%) of the fifth conductive parts 115" with respect to the fifth sensing regions R5 may be set to 25% to 28%.

In addition, the fifth sensing regions R5 may have the same area, and the fifth conductive parts 115" may also have the same area.

Referring to FIG. 14F, the sixth conductive parts 116" may be located in the sixth sensing regions R6.

In this case, the sixth conductive parts 116" may include portions of the conductive lines 701 to 704, 718 to 720, 723 to 725, 728 to 730, and 733 to 735.

For example, the area ratio (%) of the sixth conductive parts 116" with respect to the sixth sensing regions R6 may be set to 45% to 55%.

As described above, the area ratio of the first conductive part 111" with respect to the first sensing region R1, the area ratio of the second conductive part 112" with respect to the second sensing region R2, the area ratio of the third conductive part 113" with respect to the third sensing region R3, the area ratio of the fourth conductive part 114" with respect to the fourth sensing region R4, the area ratio of the fifth conductive parts 115" with respect to the fifth sensing regions R5, and the area ratio of the sixth conductive parts 116" with respect to the sixth sensing regions R6 are differently set, so that an error in pressure detection can be considerably reduced.

When the area ratio (%) of the first conductive part 111" with respect to the first sensing region R1, the area ratio (%) of the second conductive part 112" with respect to the second sensing region R2, the area ratio (%) of the third conductive part 113" with respect to the third sensing region R3, the area ratio (%) of the fourth conductive part 114" with respect to the fourth sensing region R4, the area ratio (%) of the fifth conductive parts 115" with respect to the fifth sensing regions R5, and the area ratio (%) of the sixth conductive parts 116" with respect to the sixth sensing regions R6 are set to 3.3%, 7.1%, 10.1%, 14.7%, 26.8%, and 50.3%, respectively, a difference between variations in capacitance is evaluated as a maximum of about 0.006 pF. Thus, in the case of a pressure sensor employing the first conductor 110" of FIG. 13, an error in pressure detection becomes very small.

Figure 15:
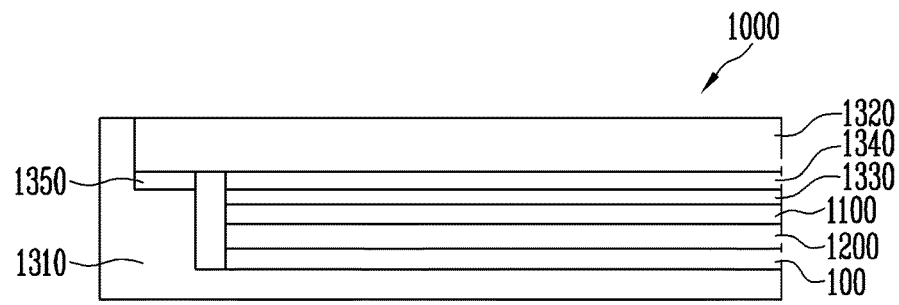
FIG. 15 is a view illustrating a display device according to an exemplary embodiment of the present disclosure.

FIG. 15 is a view illustrating a display device according to an exemplary embodiment of the present disclosure.

Referring to FIG. 15, the display device 1000 according to the exemplary embodiment of the present disclosure may include a touch sensor 1100, a display panel 1200, a pressure sensor 100, and a bracket 1310.

The touch sensor 1100, the display panel 1200, the pressure sensor 100, and the like may be accommodated in the bracket 1310.

In addition, the display device 1000 according to the exemplary embodiment of the present disclosure may further include a window 1320.

In this case, a polarizing plate 1330 may be located under the window 1320, and a first adhesive member 1340 may be located between the window 1320 and the polarizing plate 1330. However, the polarizing plate 1330 may be omitted, if necessary.

In addition, the window 1320 may be coupled to the bracket 1310 through a second adhesive member 1350.

Each of the first adhesive member 1340 and the second adhesive member 1350 may be implemented as optically transparent adhesives, other resins, tapes, etc.

Figure 16A:
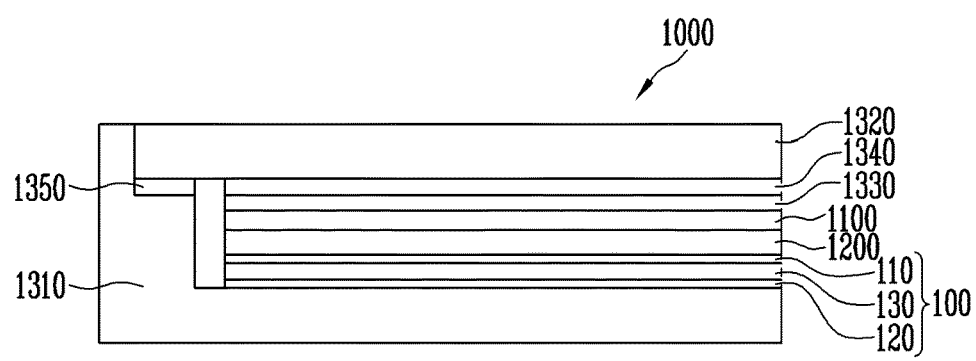
FIG. 16A is a view illustrating the display device including a pressure sensor according to an exemplary embodiment of the present disclosure.

FIG. 16A is a view illustrating the display device including a pressure sensor according to an exemplary embodiment of the present disclosure.

Referring to FIG. 16A, the pressure sensor 100 according to the exemplary embodiment of the present disclosure may include a first conductor 110, a second conductor 120, and an insulating member 130.

Particularly, the second conductor 120 may exist as a separate component. In this case, the second conductor 120 may be located on a lower portion of the bracket 1310.

The pressure sensor 100 has already been described in detail, and therefore, its description will be omitted herein.

Figure 16B:
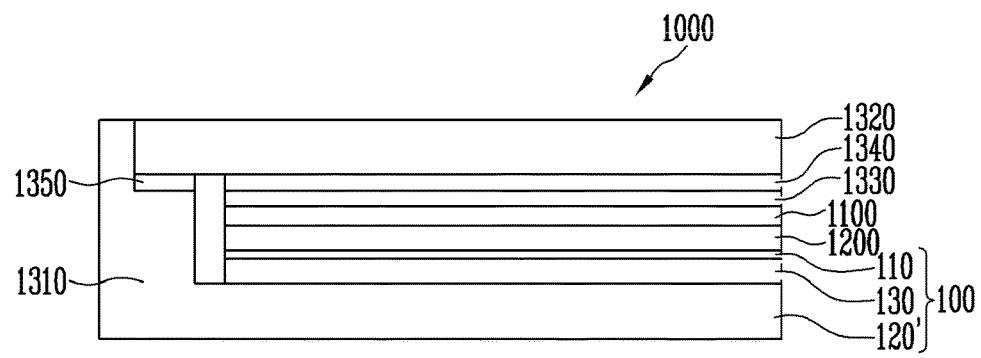
FIG. 16B is a view illustrating the display device including a pressure sensor according to another exemplary embodiment of the present disclosure.

FIG. 16B is a view illustrating the display device including a pressure sensor according to another exemplary embodiment of the present disclosure.

Referring to FIG. 16B, the pressure sensor 100 according to an exemplary embodiment of the present disclosure may include a first conductor 110, a second conductor 120', and an insulating member 130.

In particular, in the pressure sensor according to an exemplary embodiment of the present disclosure, a portion of the bracket 1310 may be used as the second conductor 120'.

The bracket 1310 may include a material having conductivity. Specifically, when a portion of the bracket 1310, which is located under the first conductor 110, has conductivity, the corresponding portion may be used as the second conductor 120'.

According to the above-described structure, redundant components can be removed. Accordingly, the thickness of the display device 1000 can be decreased, and the manufacturing cost of the display device 1000 can be reduced.

Figure 17:
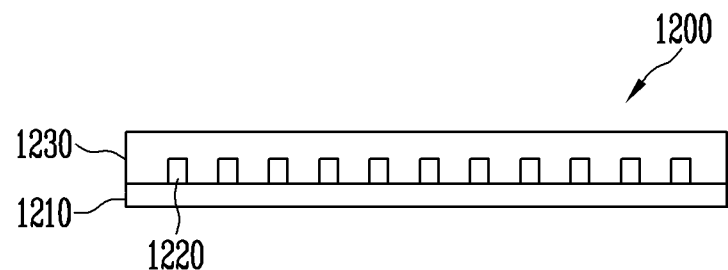
FIG. 17 is a view illustrating a display panel according to an exemplary embodiment of the present disclosure.

FIG. 17 is a view illustrating a display panel according to an exemplary embodiment of the present disclosure.

Referring to FIG. 17, the display panel 1200 may include a substrate 1210, a plurality of pixels 1220, and an encapsulation layer 1230.

The plurality of pixels 1220 may be located on the substrate 1210. In addition, the encapsulation layer 1230 may be located over the pixels 1220 and the substrate 1210.

For example, the substrate 1210 may be made of an insulative material such as glass or resin. Also, the substrate 1210 may be made of a material having flexibility to be bendable or foldable. The substrate 1210 may have a single-layered structure or a multi-layered structure.

For example, the substrate 1210 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material constituting the substrate 1210 need not be so limited, and the substrate 1210 may be made of fiber glass reinforced plastic (FRP), etc.

The pixels 1220 may emit light under the control of a display driver (not shown). The pixels 1220 may be protected by the encapsulation layer 1230.

For example, the encapsulation layer 1230 may prevent moisture, oxygen, etc. from infiltrating into the pixels 1220.

In this case, the encapsulation layer 1230 may include at least one of glass, organic matter, and inorganic matter. The encapsulation layer 1230 may have a single-layered structure or a multi-layered structure.

For example, the encapsulation layer 1230 may have a multi-layered structure including at least one organic layer and at least one inorganic layer.

The material of the organic layer may include fluorine-based carbon compounds such as polyacryl, polyimide, and Teflon, and organic insulating materials such as polyepoxy and benzocyclobutene. The material of the inorganic layer may include inorganic insulating materials such as polysiloxane acid, silicon nitride, and metal oxide including silicon oxide and aluminum oxide.

Figure 18A:
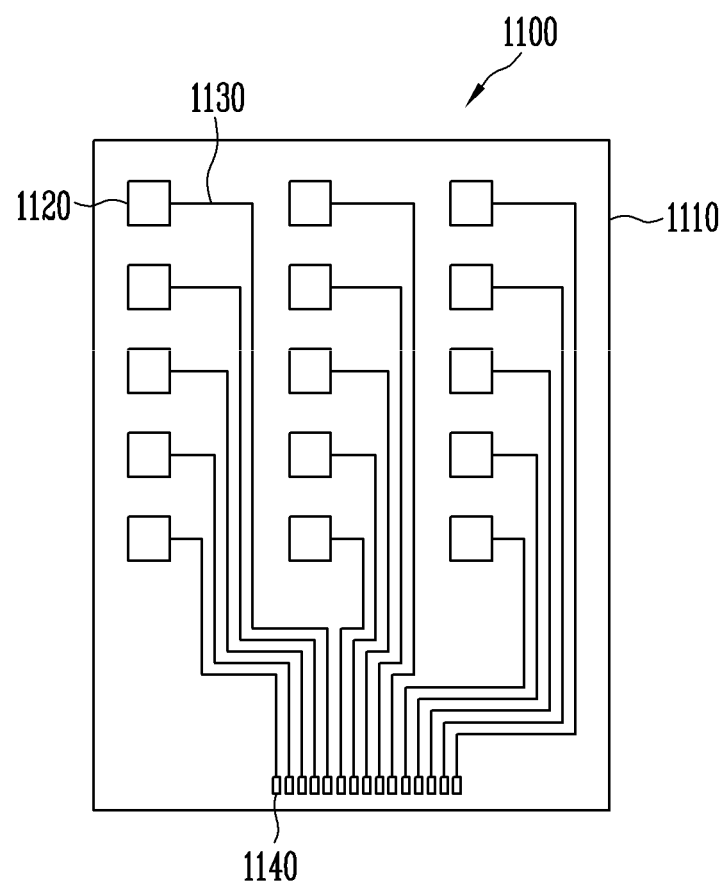
FIG. 18A and FIG. 18B are views illustrating touch sensors according to exemplary embodiments of the present disclosure.
Figure 18B:
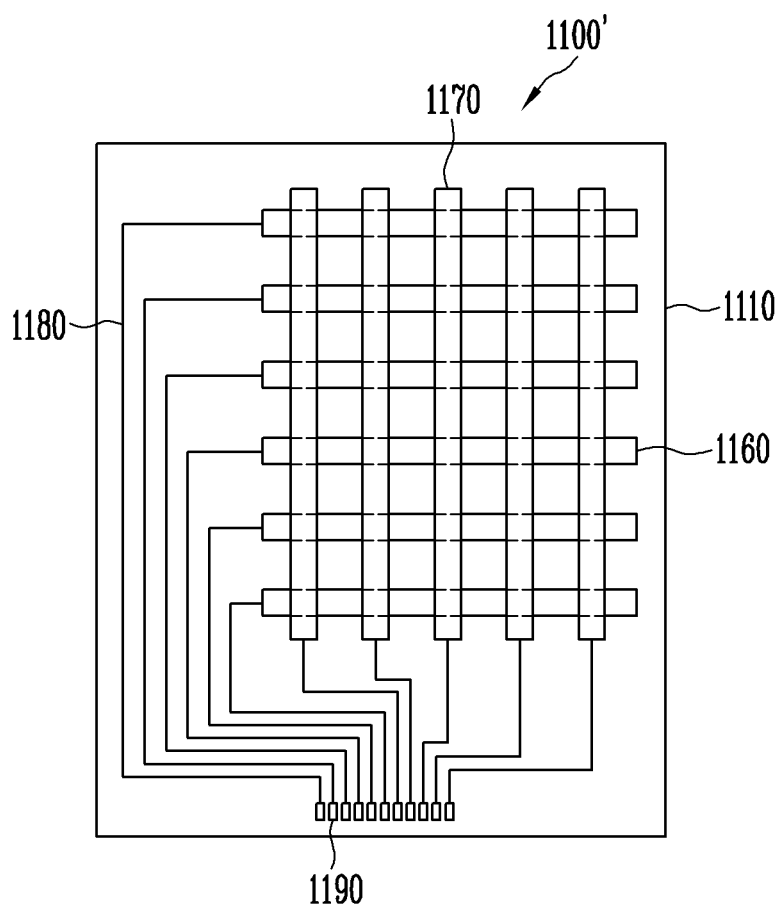

FIGS. 18A and 18B are views illustrating touch sensors according to exemplary embodiments of the present disclosure. Particularly, FIG. 18A illustrates a self-capacitive touch sensor 1100, and FIG. 18B illustrates a mutual capacitive touch sensor 1100'.

Referring to FIG. 18A, the touch sensor 1100 according to an exemplary embodiment of the present disclosure may be a self-capacitive touch sensor.

In addition, the touch sensor 1100 may include a plurality of touch electrodes 1120 and a plurality of lines 1130.

The touch electrodes 1120 may be arranged on a substrate 1110. The touch electrodes 1120 may include a conductive material.

In an exemplary embodiment of the present disclosure, the conductive material may include metals or an alloy thereof. The metals may be gold (Au), silver (Ag), aluminum (Al), molybdenum (Mo), chromium (Cr), titanium (Ti), nickel (Ni), neodymium (Nd), copper (Cu), platinum (Pt), and the like.

Meanwhile, the touch electrodes 1120 may be made of a transparent conductive material. The transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, graphene, and the like. The touch electrodes 1120 may be formed in a single layer or multiple layers.

The substrate 1110 may be made of an insulative material, such as glass or resin. Also, the substrate 1110 may be made of a material having flexibility to be bendable or foldable. The substrate 1110 may have a single-layered structure or a multi-layered structure.

For example, the substrate 1110 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material constituting the substrate 1110 need not be so limited, and the substrate 1110 may be made of fiber glass reinforced plastic (FRP), etc.

The substrate 1110 may be implemented as a separate substrate, or may be implemented as one of various components included in the display device. For example, the substrate 1110 may be the encapsulation layer 1230 included in the display panel 1200.

The lines 1130 may be connected between the touch electrodes 1120 and pads 1140. Also, the lines 1130 may be connected to a sensor controller (not shown) through the pads 1140.

When a touch is input to the touch sensor 1100, self-capacitances of the touch electrodes 1120 related to the touch are changed, and therefore, the sensor controller may detect a touch position using signals output from the touch electrodes 1120.

Referring to FIG. 18B, the touch sensor 1100' according to the embodiment of the present disclosure may be a mutual capacitive touch sensor.

In addition, the touch sensor 1100' may include first touch electrodes 1160, second touch electrodes 1170, and lines 1180.

The first touch electrodes 1160 are formed to extend in a first direction, and may be arranged in plural numbers along a second direction intersecting the first direction.

The second touch electrodes 1170 are positioned to be spaced apart from the first touch electrodes 1160 in order to operate as a mutual capacitive touch sensor together with the first touch electrode 1160.

To this end, the second touch electrodes 1170 may be arranged to intersect the first touch electrodes 1160.

For example, the second touch electrodes 1170 are formed to extend in the second direction, and may be arranged in plural numbers along the first direction.

Mutual capacitances between the first touch electrodes 1160 and the second touch electrodes 1170 are formed by the above-described arrangement of the first touch electrodes 1160 and the second touch electrodes 1170. When a touch is input to the touch sensor 1100', mutual capacitances related to the touch are changed.

In order to prevent contacts between the first touch electrodes 1160 and the second touch electrodes 1170, an insulating layer (not shown) may be formed between the first touch electrodes 1160 and the second touch electrodes 1170.

The insulating layer may be entirely formed between the first touch electrodes 1160 and the second touch electrodes 1170, or may be locally formed at intersection portions between the first touch electrodes 1160 and the second touch electrodes 1170.

The first touch electrodes 1160 and the second touch electrodes 1170 may be formed of a transparent conductive material, but may instead be formed of another conductive material, such as opaque metal.

For example, the first touch electrodes 1160 and the second touch electrodes 1170 may be formed of the same material as the above-described touch electrode 1120.

FIG. 18B illustrates that the first touch electrodes 1160 and the second touch electrodes 1170 may each be formed in a bar shape, but the shapes of the first touch electrodes 1160 and the second touch electrodes 1170 may differ from what is illustrated.

In addition, the first touch electrodes 1160 and the second touch electrodes 1170 may have a mesh structure so as to have flexibility.

The lines 1180 may be connected between the touch electrodes 1160 and 1170 and pads 1190. Also, the lines 1180 may be connected to a sensor controller (not shown) through the pads 1190.

The first touch electrodes 1160 may receive driving signals supplied from the sensor controller, and the second touch electrodes 1170 may output, to the sensor controller, sensing signals obtained by reflecting changed in capacitance.

Accordingly, the sensor controller can detect a touch position using the sensing signals output from the second touch electrodes 1170.

Here, the capacitive touch sensors 1100 and 1100' have been mainly described, but another type touch sensor may be employed.

For example, the touch sensors 1100 and 1100' may be implemented in various types such as a resistive type, an infrared beam type, a surface acoustic wave type, an integral strain gauge type, and a piezo type.

According to the present disclosure, it is possible to provide a pressure sensor and a display device including the same, which can detect touch pressure.

Also, according to the present disclosure, it is possible to provide a pressure sensor and a display device including the same, which can reduce a recognition error of touch pressure.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A pressure sensor comprising:
   a first conductor located in a pressure sensing region comprising a first sensing region and a second sensing region; and
   a second conductor spaced apart from the first conductor, the second conductor forming capacitance with the first conductor,
   wherein:
   the first conductor comprises:
   a first conductive part located in the first sensing region; and
   a second conductive part located in the second sensing region; and
   the area ratio of the second conductive part with respect to the second sensing region is different from the area ratio of the first conductive part with respect to the first sensing region.

2. The pressure sensor of claim 1, wherein, when the same pressure is applied to each of the first sensing region and the second sensing region, a variation in distance between the first conductive part and the second conductor is different from a variation in distance between the second conductive part and the second conductor.

3. The pressure sensor of claim 2, wherein the variation in distance between the first conductive part and the second conductor is greater than the variation in distance between the second conductive part and the second conductor.

4. The pressure sensor of claim 3, wherein the area ratio of the second conductive part with respect to the second sensing region is greater than the area ratio of the first conductive part with respect to the first sensing region.

5. The pressure sensor of claim 1, further comprising an elastic member disposed between the first conductor and the second conductor.

6. The pressure sensor of claim 5, wherein, when the same pressure is applied to each of the first sensing region and the second sensing region, a variation in thickness of the elastic member is changed for each of the first sensing region and the second sensing region.

7. The pressure sensor of claim 1, wherein the first sensing region is located at the center of the pressure sensing region, and the second sensing region surrounds the first sensing region.

8. The pressure sensor of claim 7, wherein the pressure sensing region has a quadrangular shape.

9. The pressure sensor of claim 8, wherein:
the first sensing region and the second sensing region have quadrangular shapes; and
the pressure sensing region further comprises four third sensing regions respectively contacting sides of the second sensing region and four fourth sensing regions respectively located at corners of the pressure sensing region.

10. The pressure sensor of claim 9, wherein the first conductor further comprises:
third conductive parts respectively located in the third sensing regions; and
fourth conductive parts respectively located in the fourth sensing regions,
wherein the area ratio of the first conductive part with respect to the first sensing region, the area ratio of the second conductive part with respect to the second sensing region, the area ratio of the third conductive parts with respect to the third sensing regions, and the area ratio of the fourth conductive parts with respect to the fourth sensing regions are different from one another.

11. The pressure sensor of claim 10, wherein the area ratio of the first conductive part with respect to the first sensing region, the area ratio of the second conductive part with respect to the second sensing region, the area ratio of the third conductive parts with respect to the third sensing regions, and the area ratio of the fourth conductive parts with respect to the fourth sensing regions sequentially increase.

12. The pressure sensor of claim 9, wherein:
each of the fourth sensing regions has a triangular shape comprising a first side, a second side, and a third side connected between the first side and the second side; and
vertexes of the second sensing region contact the third sides of the fourth sensing regions, respectively.

13. The pressure sensor of claim 12, wherein a first side of the second sensing region is parallel to a first side of the first sensing region, and has a length two times greater than that of the first side of the first sensing region.

14. The pressure sensor of claim 13, wherein a first side of the pressure sensing region is parallel to the first side of the first sensing region, and has a length three times greater than that of the first side of the first sensing region.

15. The pressure sensor of claim 7, wherein the pressure sensing region further comprises:
a third sensing region surrounding the second sensing region;
a fourth sensing region surround the third sensing region;
four sixth sensing regions respectively located at the corners of the pressure sensing region; and
four fifth sensing regions located between the fourth sensing region and the sixth sensing regions.

16. The pressure sensor of claim 15, wherein the first conductor further comprises:
a third conductive part located in the third sensing region;
a fourth conductive part located in the fourth sensing region;
fifth conductive parts located in the fifth sensing regions; and
sixth conductive parts located in the sixth sensing regions,
wherein the area ratio of the first conductive part with respect to the first sensing region, the area ratio of the second conductive part with respect to the second sensing region, the area ratio of the third conductive part with respect to the third sensing region, the area ratio of the fourth conductive part with respect to the fourth sensing region, the area ratio of the fifth conductive parts with respect to the fifth sensing regions, and the area ratio of the sixth conductive parts with respect to the sixth sensing regions are different from one another.

17. The pressure sensor of claim 16, wherein the area ratio of the first conductive part with respect to the first sensing region, the area ratio of the second conductive part with respect to the second sensing region, the area ratio of the third conductive part with respect to the third sensing region, the area ratio of the fourth conductive part with respect to the fourth sensing region, the area ratio of the fifth conductive parts with respect to the fifth sensing regions, and the area ratio of the sixth conductive parts with respect to the sixth sensing regions sequentially increase.

18. A display device comprising:
a display panel;
a touch sensor located at a first side of the display panel, the touch sensor configured to detect a position of a touch; and
a pressure sensor located at a second side of the display panel opposite the first side, the pressure sensor detecting pressure of the touch,
wherein the pressure sensor comprises:
a first conductor located in a pressure sensing region comprising a first sensing region and a second sensing region; and
a second conductor spaced apart from the first conductor, the second conductor forming capacitance with the first conductor,
wherein the first conductor comprises:
a first conductive part located in the first sensing region; and
a second conductive part located in the second sensing region,
wherein the area ratio of the second conductive part with respect to the second sensing region is different from the area ratio of the first conductive part with respect to the first sensing region.

19. The display device of claim 18, further comprising a bracket accommodating the display panel, the touch sensor, and the pressure sensor therein.

20. The display device of claim 19, wherein a portion of the bracket comprises the second conductor.

21. The display device of claim 18, wherein, when the same pressure is applied to each of the first sensing region and the second sensing region, a variation in distance between the first conductive part and the second conductor is different from a variation in distance between the second conductive part and the second conductor.

22. The display device of claim 21, wherein the variation in distance between the first conductive part and the second conductor is greater than the variation in distance between the second conductive part and the second conductor.

23. The display device of claim 22, wherein the area ratio of the second conductive part with respect to the second sensing region is greater than the area ratio of the first conductive part with respect to the first sensing region.

24. The display device of claim 18, further comprising an elastic member disposed between the first conductor and the second conductor.

25. The display device of claim 24, wherein, when the same pressure is applied to each of the first sensing region and the second sensing region, a variation in thickness of the elastic member is changed for each of the first sensing region and the second sensing region.

26. The display device of claim 18, wherein the first sensing region is located at the center of the pressure sensing region, and the second sensing region surrounds the first sensing region.

27. The display device of claim 26, wherein the pressure sensing region has a quadrangular shape.

28. The display device of claim 27, wherein:
the first sensing region and the second sensing region have quadrangular shapes; and
the pressure sensing region further comprises four third sensing regions respectively contacting sides of the second sensing region and four fourth sensing regions respectively located at corners of the pressure sensing region.

29. The display device of claim 28, wherein the first conductor further comprises:
third conductive parts respectively located in the third sensing regions; and
fourth conductive parts respectively located in the fourth sensing regions,
wherein the area ratio of the first conductive part with respect to the first sensing region, the area ratio of the second conductive part with respect to the second sensing region, the area ratio of the third conductive parts with respect to the third sensing regions, and the area ratio of the fourth conductive parts with respect to the fourth sensing regions are different from one another.

30. The display device of claim 29, wherein the area ratio of the first conductive part with respect to the first sensing region, the area ratio of the second conductive part with respect to the second sensing region, the area ratio of the third conductive parts with respect to the third sensing regions, and the area ratio of the fourth conductive parts with respect to the fourth sensing regions sequentially increase.

31. The display device of claim 28, wherein:
each of the fourth sensing regions has a triangular shape including a first side, a second side, and a third side connected between the first side and the second side; and
vertexes of the second sensing region contact the third sides of the fourth sensing regions.

32. The display device of claim 31, wherein a first side of the second sensing region is parallel to a first side of the first sensing region, and has a length two times greater than that of the first side of the first sensing region.

33. The display device of claim 32, wherein a first side of the pressure sensing region is parallel to the first side of the first sensing region, and has a length three times greater than that of the first side of the first sensing region.

34. The display device of claim 26, wherein the pressure sensing region further comprises a third sensing region surrounding the second sensing region, a fourth sensing region surrounding the third sensing region, four sixth sensing regions respectively located at the corners of the pressure sensing region, and four fifth sensing regions located between the fourth sensing region and the sixth sensing regions.

35. The display device of claim 34, wherein the first conductor further comprises:
a third conductive part located in the third sensing region;
a fourth conductive part located in the fourth sensing region;
fifth conductive parts located in the fifth sensing regions; and
sixth conductive parts located in the sixth sensing regions,
wherein the area ratio of the first conductive part with respect to the first sensing region, the area ratio of the second conductive part with respect to the second sensing region, the area ratio of the third conductive part with respect to the third sensing region, the area ratio of the fourth conductive part with respect to the fourth sensing region, the area ratio of the fifth conductive parts with respect to the fifth sensing regions, and the area ratio of the sixth conductive parts with respect to the sixth sensing regions are different from one another.

36. The display device of claim 35, wherein the area ratio of the first conductive part with respect to the first sensing region, the area ratio of the second conductive part with respect to the second sensing region, the area ratio of the third conductive part with respect to the third sensing region, the area ratio of the fourth conductive part with respect to the fourth sensing region, the area ratio of the fifth conductive parts with respect to the fifth sensing regions, and the area ratio of the sixth conductive parts with respect to the sixth sensing regions sequentially increase.

* * * * *